US008457181B2

(12) United States Patent
Remy et al.

(10) Patent No.: US 8,457,181 B2
(45) Date of Patent: Jun. 4, 2013

(54) RATE AGILE RATE-ADAPTIVE DIGITAL SUBSCRIBER LINE

(75) Inventors: Terrence E Remy, Bowie, MD (US); James E. Sylvester, McLean, VA (US)

(73) Assignee: Intellectual Ventures II LLC, Wilmington, DE (US)

(*) Notice: Subject to any disclaimer, the term of this patent is extended or adjusted under 35 U.S.C. 154(b) by 1550 days.

(21) Appl. No.: 11/961,018

(22) Filed: Dec. 20, 2007

(65) Prior Publication Data
US 2008/0095188 A1    Apr. 24, 2008

Related U.S. Application Data

(63) Continuation of application No. 10/755,423, filed on Jan. 12, 2004, now Pat. No. 7,317,754.

(51) Int. Cl.
*H04B 1/38* (2006.01)
(52) U.S. Cl.
USPC ........... 375/222; 375/220; 375/219; 375/354; 375/371; 375/377; 375/259; 375/224; 375/225; 375/226; 375/227; 375/228; 379/93.01; 379/27.03; 379/27.01; 379/399.01; 379/114.06; 379/187; 379/1.04; 379/88.23; 379/88.25; 379/156; 379/165; 379/197; 379/225
(58) Field of Classification Search
CPC .............. H04M 11/062; H04Q 11/0478; H04Q 2213/13389; H04Q 2213/13199; H04Q 2213/13039; H04L 12/2801; H04L 12/2856; H04L 29/06523; H04L 47/822; H04L 5/006; H04L 12/2876; H04L 2012/563; H04N 7/17309; H04N 21/2543
USPC .................. 375/222, 219, 354, 371, 220, 377, 375/259, 224, 225, 226, 227, 228; 455/557, 455/550.1, 557.01, 39, 67.11; 370/468, 253, 370/392, 236, 395.5; 379/156, 165, 197, 379/225, 93.01, 27.03, 27.01, 399.01, 114.06, 379/187, 1.04, 88.23, 88.25
See application file for complete search history.

(56) References Cited

U.S. PATENT DOCUMENTS

| | | | |
|---|---|---|---|
| 6,009,122 A * | 12/1999 | Chow | 375/260 |
| 6,798,769 B1 * | 9/2004 | Farmwald | 370/352 |
| 6,891,832 B1 * | 5/2005 | Chien et al. | 370/395.1 |
| 7,035,249 B2 * | 4/2006 | Christensen et al. | 370/352 |
| 7,167,548 B1 * | 1/2007 | Fedane | 379/93.06 |
| 2002/0154637 A1 * | 10/2002 | Keller-Tuberg | 370/394 |
| 2003/0202570 A1 * | 10/2003 | Bella et al. | 375/222 |

* cited by examiner

*Primary Examiner* — Daniel Washburn
*Assistant Examiner* — Rahel Guarino

(57) ABSTRACT

Methods and apparatus for maintaining the maximum achievable data rate on a DSL line, up to and including a rate to which a user subscribes is described. Performance monitoring is conducted on the DSL line on an ongoing basis to determine noise margins in each direction. Each noise margin is compared against pre-determined decreasing/increasing thresholds to determine whether the line characteristics dictate a data rate change without loss of synchronization. The invention supports dynamic provisioning changes including application driven service level change requests, e.g., new bandwidth-on demand services. In some embodiments, a combination of existing and new embedded operations channel (EOC) messages are used to implement the modem data rate changes. New EOC messages may be implemented using some of the reserved and/or vendor proprietary Opcodes currently permitted. Modem assigned data rate changes are implemented without a disruption of service, e.g., without the need for re-initialization and/or re-synchronization.

26 Claims, 9 Drawing Sheets

| | HEX | Opcode Meaning | Direction | Abbreviations |
|---|---|---|---|---|
| 902 | HEX | Opcode Meaning | Direction | Abbreviations |
| 904 | 13 | Request Test Parameter Update | d/u | REQTPU |
| 906 | (20,23,25,26,) (29,2A,2C,2F) (31,32,34,37) (38,3B,3D3E) | Write Data registers number 0-F | d/u | Write |
| 908 | (40,43,45,46) (49,4A,4C,4F) (51,52,54,57) (58,5B,5D,5E) | Read Data registers number 0-F | d/u | Read |
| 910 | 19 | Write new Data Rate | d/u | New Write |
| 912 | 1A | Request new Data Rate | u | REQNDR |
| | | | | |

Fig. 9

RATE AGILE RATE-ADAPTIVE DIGITAL SUBSCRIBER LINE

This application is a continuation of U.S. patent application Ser. No. 10/755,423, filed on Jan. 12, 2004, now U.S. Pat. No. 7,317,754, which is incorporated herein by reference in its entirety.

FIELD OF THE INVENTION

The present invention relates generally to the field of communications systems and, more particularly, to the field of Digital Subscriber Line (DSL) data rate control.

BACKGROUND OF THE INVENTION

ADSL communications rates are normally established between a customer's modem and the central office equipment based on initial line conditions and a subscribed to service rate. This initial line rate normally remains fixed unless poor line conditions interrupt service or communication with the central office is interrupted for some other reason, e.g., as part of provisioning a new service rate. Any re-synchronization results in a disruption of service. Resynchronization due to poor line conditions can result in a ratcheting down in the provided line rate over time. To provision a higher service rate, e.g., in response to a subscriber request for a change in service, a full initialization operation is normally performed which disrupts any ongoing communications sessions being conducted over the line. Thus, in current systems, line rates are not changed on-the-fly and a service subscriber must subscribe to a rate which supports the most demanding application used by the subscriber even if the high bandwidth application is used only on a sporadic basis or face interruptions in service each time a rate change is made.

Problems with existing DSL will become clear if one appreciates the existing setup and resynchronization process. In asymmetric Digital Subscriber Line (ADSL) systems, a user's modem at a customer site, e.g., an ADSL Termination Unit-Remote (ATU-R), when powered on, attempts to establish communications with a modem at a central office, e.g. a Digital Subscriber Line Access Multiplexer (DSLAM) Line Port, ADSL Termination Unit-Central office (ATU-C).

Known initialization sequences, used to establish communications between a central office's DSLAM modem, an ATU-C, and a Customer Premises Equipment (CPE) modem, an ATU-R, in the ADSL environment are described below. These initialization sequences are sometimes referred to as the training-up of the modem or 'showtime'. The series of events comprising the initialization sequence may be initiated due to any of the following conditions.

1. The initial power-up of the ATU-R.
2. Subsequent power-up or reboot of the ATU-R.
3. Loss of power to the ATU-R and subsequent restoration of power to the ATU-R.
4. The initial power-up; reset or re-provision of the ATU-C.
5. Loss of sync between the ATU-C and the ATU-R.
6. Loss of power to the ATU-C and subsequent restoration of power to the ATU-C.
7. Replacement of the DSLAM Line Card with ATU-C ports and initialization of the Line Card.

The drawing 100 of FIG. 1 describes a known initialization sequence used to establish communications, in an ADSL environment, between a central office DSLAM modem ATU-C 102 and a CPE modem ATU-R 104 for the ANSI T1.413 mode of operation. The ADSL initialization signals can be described in terms of frequencies or, equivalently, in terms of the tone indices representing those frequencies, where the frequency of tone k is k*4.3125 kHz. ATU-C 102 is in a quiescent state, C-QUIET 106, monitoring for an activation signal from ATU-R 104. ATU-R 104 generates an initial activation request signal, R-ACT-REQ 108, defined as the k=8 tone (34.5 kHz), sends signal R-RACT-REQ 108 to ATU-C 102, and then enters a quiescent monitoring state, R-QUIET 110. ATU-C 102 receives the R-ACT-REQ 108 signal and generates a response signal, C-ACT 114. The C-ACT 114 signal is used to select timing modes, and may be one of the following signals: C-ACT1k=48 tone(207 kHz), C-ACT2k=44 tone (189.75 kHz), C-ACT3k=52 tone (224.25 kHz), or C-ACT4k=60 tone (258.75 kHz). ATU-C 102 sends the selected C-ACT 114 signal to ATU-R 104, and enters a quiescent monitoring state, C-QUIET2 116. ATU-R 104 receives C-ACT signal 114 and generates an acknowledgment signal R-ACK 118. The R-ACK 118 signal acknowledges reception of the C-ACT signal 114, and selects some additional parameters, where R-ACK 118 is one of the following signals: R-ACT1: k=10 tone (43.125 kHz) or R-ACT2k=12 tone (51.76 kHz). ATU-R 104 sends the selected R-ACK signal 118 to ATU-C 102, and then enters a quiescent monitoring state, R-QUIET2 120. ATU-C 102 receives the R-ACT signal 118, generates an acknowledgement signal, C-REVEILLE 112, which is the k=56 tone (241.5 kHz) tone, and sends C-REVEILLE 122 to the ATU-R 104. ATU-R 104 detects the C-REVEILLE signal 122, waits until C-REVEILLE 122 has finished, and then sends R-REVERB1 signal 124. R-REVERB1 124 is the first signal in the initialization sequence that is not a single tone. The extract tones (subchannels) used to generate R-REVERB1 124 are vendor discretionary, and may be from 1 to 31. To ensure that the R-REVERB1 signal 124 has the same power spectral density (PSD) mask as the ADSL upstream data, the most common tones begin at tone or 7 and end at tone 30 or 31.

A known initialization sequence is used to establish communications in an ADSL environment between a central office DSLAM modem, ATU-C 102, and a CPE modem, ATU-R 104. The G.dmt (G.hs) mode of operation shall now be described. G.hs uses 3-tone redundancy for robustness of ADSL modem training. The ATU-R 104 sends tones k=9, 17, 25 to indicate that ATU-R 104 can operate in ADSL over POTS (G.dmt Annex A). These three tones (k=9, 17, 25) are known as the A43 upstream carrier set. The ATU-R 104 may also send tones k=37, 45, and 53 to indicate that it can communicate G.hs information over these carriers as well. These tones (k=37, 45, 53 ) are the B43 upstream carrier set. ATU-C 102, which has been monitoring for a request from ATU-R 104, receives the upstream carrier set(s) and responds with a downstream carrier set(s) of tones. Tones k=40, 56, 64, which are the A43 downstream carrier set, indicate that ATU-C 102 can operate in ADSL over POTS. Also, the ATU-C 102 may send tones k=72, 88, 96, which are the B43 downstream carrier set, to indicate that it can communicate using this carrier set as well.

Modems 102, 104 then communicate, negotiate capabilities and train the transceivers using the negotiated parameters. The negotiation of capabilities may involve: sending test signals on the DSL line, measuring of Signal-to-Noise-Ratio (SNR) and Attenuation (ATN) at the receiving end of the line, requesting test parameter updates, obtaining initial values for maximum possible achievable data rates on the DSL line between modems 102 and 104, transferring initial subscribed data rate information to ATU-C 102 from a provisioning system, calculating an initial assigned data rate value, and transferring of the assigned data rate value from ATU-C 102 to ATU-R 104.

The ITU G.002.1 G.DMT standard, which may be used by DSLAM modem ATU-C 102 and CPE modem ATU-R 104, divides frequencies into 255 sections, or bins. The separation between each bin is 4.3125 KHz. Each bin can carry 0 or $2^{15}$ bits, with the resulting possible bit rates in increments of 32 Kbps. The downstream data traffic, from Central Office DSLAM Line port modem ATU-C 102 to the user's CPE modem ATU-R 104 uses bins 37 to 255, or 159.562525 to 1099.6875 KHz. The upstream data traffic, from the user's CPE modem ATU-R 104 to the Central Office DSLAM modem ATU-C 102, uses bins 6 to 29, or 25.875 to 125.0625 KHz. Noise and other interference on the line cause attenuation on the line, which in turn decreases the Signal-to-noise ratio, SNR. During initialization, based upon provisioning and determined maximum achievable data rate, the modem ATU-R is assigned data rates designating which bins may be used for the upstream and downstream directions.

In known systems, once a CPE modem ATU-R 104 is powered on, it periodically sends out a tone (R-ACT-REQ) 108 in T1.413 and/or multiple tones (upstream carrier set(s)) in G.hs, in at attempt to sync to the ATU-C 102, as previously described. Once sync has been established between modems ATU-R 104 and ATU-C 102 and the initial provisioning has completed, resulting in an assigned data rate value, the ATU-R 104 may communicate with the ATU-C 102 at that initial assigned data rate value. Communications may be interrupted by the following fault or termination conditions: a power loss at either end, the threshold of the sync margin is negatively impacted, or the SNR falls below an acceptable level, e.g., due to changing line conditions. In any of these fault or termination scenarios, including the low SNR case, the modem, ATU-R 104 will attempt to re-sync with the ATU-C 102, e.g., at a new lower data rate.

Unfortunately, the re-synchronization process causes a disruption of service. If the re-sync was triggered by an unacceptable low SNR, typically the new initial assigned data rate value established during the re-initialization process will be lower than the previous date rate. Thus, over extended periods of time, the re-synchronization process often results in a ratcheting down in terms of the data rate since the re-sync process is triggered in response to decreasing line condition quality but not improvements in SNR. This is understandable since the current process involves disrupting any on-going communications session when resynchronization is performed to implement a data rate change.

Thus, in know systems, there is no method today to gracefully decrease the assigned data rate to adapt to changing line conditions without a disruption in service, i.e., the resynchronization process used at start up is used each time SNR falls to an unacceptable level.

In existing systems, if the line conditions are insufficient during initialization, to set the assigned data rate at the subscribed to, e.g., provisioned, data rate, the assigned data rate is set at a lower supported data rate, and the user is limited to that lower assigned rate as a ceiling date rate for the communications session. With known systems, there is no attempt to increase the assigned data rate if the line conditions should improve during operation, and there is no method today to increase the assigned data rate without going through an initialization sequence which results in a disruption of service.

Users of DSL lines, at different times, require different levels of service, e.g., based on the application currently in use. For example a user may primarily use the DSL line for voice and require a relatively low data rate; however, occasionally, for short intervals, the DSL line may also be used for video conferencing requiring a relatively high data rate. In order for the user to satisfy his needs, he could continuously subscribe to a higher level of service than he generally needs; however, this approach is inefficient since during most of the time, the user would be wasting bandwidth, e.g., by paying for bandwidth that goes unused. It would be advantageous if service level changes could be requested and implemented on demand, to supply additional bandwidth when needed by a specific application then remove the additional bandwidth when the application terminates without interfering with other on-going communications sessions which are terminated in existing systems.

Based upon the above discussion, it is clear that there is a need to have a dynamic and seamless adjustment capability for controlling DSL modem rates without the need to perform a complete initialization/resynchronization process which would interfere with ongoing communications sessions. In particular, there is a need for supporting downward rate adjustments in the case of a worsening of line conditions, e.g., before synchronization is lost. There is also a need for allowing a line rate to be increased in response to improved line conditions without requiring re-synchronization processes which would interfere with existing communications sessions. In addition, there is a need for a method which would allow a DSL rate to be changed, e.g., in response to changes in a subscriber's services needs, without interrupting existing communications sessions.

SUMMARY OF THE INVENTION

In DSL communication systems, a user subscribes or purchases a service plan, specifying a DSL level of service, corresponding to maximum DSL data rates that the user may be assigned. The provisioning system will retain the provisioned rate information associated with a user for future reference. When a user, with a CPE DSL modem, powers on, attempts to initialize, establish synchronization, and establish communications, the CPE DSL modem performs an initialization sequence, an exchange of signaling and information, with a central office DSLAM modem. The initialization sequence may involve an initial determination of the line characteristics, e.g., line attenuation and SNR, to find out the current maximum supported data rate on the DSL line. The supported data rate is the maximum rate, under the present line conditions that may be used while still maintaining an acceptable SNR corresponding to an acceptable bit error rate during data transmissions. Then, the DSLAM modem, using the lower of the provisioned rate and the supported rate as an upper boundary, may assign a data rate to the subscriber. In some embodiments, the line data rate is changed in 32 Kbps increments.

In accordance with the invention, the CPE DSL modem and/or the DSLAM modem, during normal operation, monitors the line characteristics, e.g., SNR and ATN on an ongoing, e.g., periodic basis, and determines, as a function of one or more signal to noise measurements, a noise margin. For each noise margin determined, a comparison may be performed against pre-determined limits, e.g., a decreasing adjustment threshold, to determine whether the line quality has degraded, and may, in the near future, no longer support the current assigned data rate, which could result in an interruption in service and the need for resynchronization. The decreasing adjustment threshold level can be set at a level that will trigger a transition to a lower supportable data rate, before any interruption in service occurs, e.g., before interruption of service and full resynchronization is required. In accordance with the invention, this triggered transition to a lower supportable data rate level may be performed dynamically during operation, without any interruption in service, re-initialization, or resynchronization. For each noise margin determined, a comparison may also be made against predetermined limits, e.g., an increasing adjustment threshold, the determine whether the line quality has improved enough to support a higher data rate. In such a case where it is determined that the line quality will support a higher data rate, the line rate may be increased without loss in synchronization and/or interruption of service. The new line rate is normally less than or equal to the currently subscribed to, e.g., provisioned, level which is used as an upper limit on the data rate supplied, line conditions permitting. The assigned data rate level may be increased by one step level at a time, e.g., in 32 Kbs increments, in accordance with the invention. The increase in data rate between the DSLAM and CPE DSL modems may be accomplished without an interruption in service, re-initialization, or resynchronization, in accordance with the invention. The methods of the current invention, allow for a user's assigned data rate to be dynamically and seamlessly varied up or down, tracking the varying line conditions, and providing the user with the highest achievable data rate, for which the user is provisioned.

The approach, of performance monitoring with ongoing rate adjustments, of the invention, is in sharp contrast, to the known methods of modem rate control, where a subscriber's assigned line rate is set once, during initialization, at the supportable rate at that time, which may be at or below the subscribed (purchased) provisioned rate and does not change during operation unless communication is interrupted and a resynchronization process is performed. In the known method, if the initial assigned rate was set below the provisioned rate, e.g., due to poor initial conditions, the rate will not be adjusted upward and the user will have to operate at the lower rate even if line conditions should improve to the point where a higher data rate could be supported. In the known method, if the line quality drops to no longer support the initial assigned rate, the CPE DSL modem will lose communications with the DSLAM modem, and the CPE DSL modem re-initializes and re-synchronizes to re-establish communications at a lower data rate. Thus, in contrast to the known systems which interrupt communications with each upward or downward rate change, the present invention supports rate changes without interfering with ongoing communications sessions.

In accordance with another novel feature of the invention, service level request changes may be processed dynamically during normal operations by the provisioning system. Service level request changes can be communicated to the provisioning system from the subscriber over the DSL connection, e.g., via an Internet connection, and/or another communication path such as a telephone line. Service level change requests may include long term subscribed provisioning changes and/ or short term or temporary application driven changes. The application driven change requests may include new services to be sold by service providers, e.g., bandwidth-on-demand type services. The service provider could provide the user with temporary high bit rate services, e.g., when evoked by a request from a specific application, and then terminate the high bit rate service, when the application completes. Such services can be billed on a usage basis instead of a flat rate if desired. The dynamic service level request changes are forwarded via the provisioning system to the DSLAM and/or CPE DSL modem where new subscribed data levels are installed. Current maximum supportable levels are determined, based on current line conditions. A comparison is made between the new subscribed rate and the current maximum supported rate, and the assigned rate is adjusted accordingly. If at the time of the service level change request, the new subscriber rate, was not supported by the current line conditions, the new subscribed data rate is still loaded into the DSLAM and/or CPE DSL modems; this allows for future upward ratcheting of the assigned data rate by the performance monitoring routine, should line conditions permit. This transition of the DSLAM and CPE DSL modems to a new assigned rate is performed without interruption of service, re-initialization, or re-synchronization, in accordance with the invention.

The data rate change implementation of the present invention may be implemented through hardware, software, firmware, and/or any combination thereof in the communications system. Such implementations may include modifications to the line card in the DSLAM modem such as adding firmware to allow the line port data rate to be changer "on-the-fly" without the need to re-sync with the remote CPE DSL modem. Changes may also include modifications in the firmware of the CPE DSL modem to accommodate dynamic data rate changes and implement the associated signaling. In some embodiments, the signaling may be accomplished using the Embedded Operation Channel (EOC) with a combination of new and/or existing messages, where some of the new messages may be structured by using some of the existing undefined Opcodes reserved for future use and/or some of the Opcodes reserved for vendor proprietary use.

In various embodiments, the data rates for the upstream and downstream data flows are handed independently. For example, each direction may have separately provisioned rates, separate service request changes, separate noise margin measurements, separate threshold adjustment criteria, separate achievable rates, and separate assigned rates. Alternatively, data rates for the upstream and downstream data flows may be handled as a single entity. Various combinations are also possible, in accordance with the invention, where certain aspects, e.g., adjustment threshold criteria, may be uniform for the downstream and upstream directions, but assigned data rates may be different for each direction.

Various embodiments of the invention may distribute the various functions of the invention, differently between the various components of the system. For example, in some embodiments, downstream requests for new data rates are generated in the DSLAM modem, while the CPE DSL modem shall provide SNR and ATN information to the DSLAM modem, when requested. In other embodiments, the CPE DSL modem performs SNR/ATN measurements, calculates downstream noise margins, and initiates and sends requests for downstream data rate changes to the DSLAM modem.

The methods and apparatus of the present invention may be utilized on a variety of DSL type systems, e.g., Asymmetric Digital Subscriber Line (ADSL), RADSL (Rate-Adaptive DSL), Very High Data Rate Subscriber Line (VDSL), etc.

Numerous additional features and benefits of the methods and apparatus of the present invention are discussed below in the detailed description which follows.

BRIEF DESCRIPTION OF THE FIGURES

FIG. 9 shows a table identifying some EOC Message Opcodes that may be used to communicate information in accordance with the present invention in some implementations of the present invention.

DETAILED DESCRIPTION

The present invention is directed to methods and apparatus which allow for transitions in DSL line rates in response to changes in line conditions and/or subscriber request for changes in service without interfering with on-going communications sessions as may occur in the case where a full re-initialization operation is used to implement a rate change.

Figure 2:
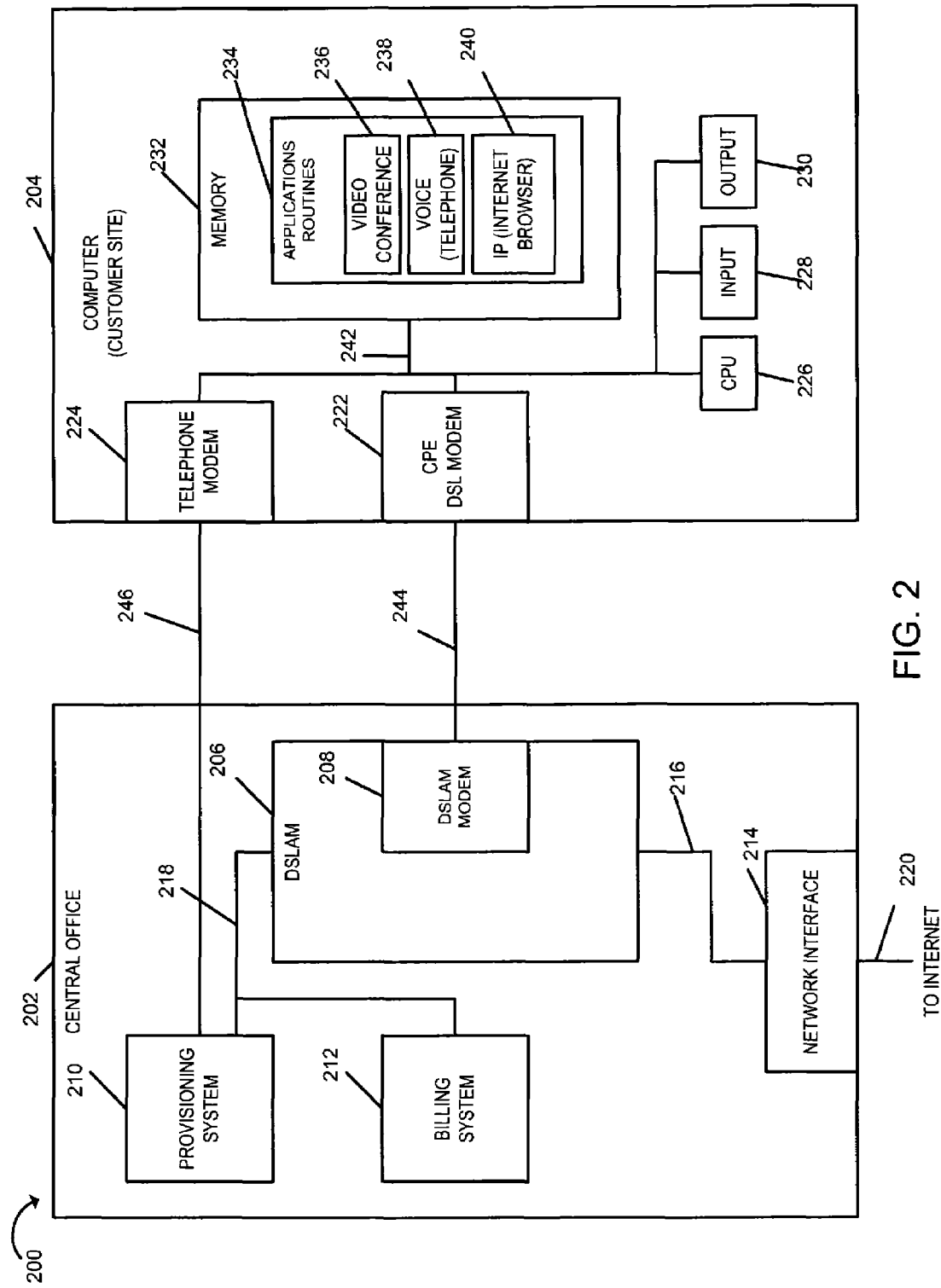
FIG. 2 illustrates an exemplary DSL communications system implemented in accordance with the present invention.

FIG. 2 illustrates an exemplary DSL communications system 200 using apparatus implementing the methods of the present invention. Communications system 200 includes a central office 202 and a computer 204 located at a customer site. The central office 202 includes a DSLAM 206 including a DSLAM modem 208, a provisioning system 210, a billing system 212 and a network interface 214. DSLAM 206, provisioning system 210, and billing system 212 are coupled together via bus 218 over which the various the various elements 206, 210, and 212 can interchange data and information. Provisioning system 210 stores user service level profiles, receives and processes service level request changes, supplies user provisioned service level information to the DSLAM 206 to the control maximum data rate at DSLAM modem 208 for each specific user, and forwards provisioning information tracking user connection times at specific data rates to the billing system 212. The billing system 212 receives information from the provisioning system 210 and/or the DSLAM 206 allowing the central office 202 to track and bill each user for the service level provided. DSLAM 206 is also coupled to network interface 214 via link 216 providing the DSLAM 206 and its Modem 208 with an interface to the Internet 220 and effectively coupling DSLAM modem 208 to other modems and other users in addition to the user at computer site 204. DSLAM modem 208 provides a DSL interface to customer site computer 204, accepts service level provisioning information from provisioning system 210, forwards current service level information to billing system 212, monitors DSL line 244 for current quality of service and faults, controls the data rates on the DSL line 244, executes initialization sequences, and controls (assigns) data rates on the DSL line 244.

The computer 204, at the customer site includes a CPE DSL modem 222, a telephone modem 224, a CPU 226, input devices 228, output devices 230, and memory 232 coupled together via bus 242, over which the various elements can interchange data and information. Input devices 228 may include microphones, keyboards, keypads, video recording devices, etc. Output devices 230 may include speakers, video displays, printers, etc. Memory 232 may include applications routines 234 including videoconference routine 236, voice (telephone) routines 238, and IP (internet browser) routines 240. Each application software routine 236, 238, 240 may be associated with a different desired level of bandwidth, e.g., a different requested data rate for DSL modem 222 corresponding to each routine 236, 238, 240. CPU 226 executes routines and uses the data/information in memory 232 to control the functionality of computer 204 including the interaction between the modems 222, 224 with the I/O devices 228, 230, to implement the various application software routines 234, and to process service level change requests. Such request may be communicated to the provisioning system over the Internet or by telephone. Link 246, e.g., a twisted pair connection, couples the telephone modem 224 of the customer's computer 204 to the provisioning system 210 at central office 202. Telephone modem 224 may convey change in service level requests to provisioning system 210. DSL line 244 couples CPE DSL modem 222 to DSLAM modem 208. CPE DSL modem 222 provides the user of computer 204 with a DSL interface to the central office 202 via DSLAM modem 208. DSL modem 222 forwards and receives user information, e.g., voice, video, data, to or from a correspondent user via DSLAM modem 208, forwards service level provisioning requests to provisioning system 210, monitors the DSL line 244 for current quality of service and faults, requests data rates on the DSL line 244, provides line quality reports e.g., SNR/ATN info to DSLAM modem 208, executes initialization sequences and executes data rate change sequences.

A user of computer 204 may generate a service level change request during operation of modem 222, and the change request may be processed and implemented without a disruption of service of modem 222 or the need to re-initialize modem 222, in accordance with the invention. The service level change request may be a long term change, e.g., user profile type changes, and/or short term or temporary changes, e.g., application driven changes, requesting a new service level for a period of user time while the user is connected. For example, a user may make a long term profile change, e.g., subscribe to a plan with a higher available DSL data rate, via an input device 228 such as a telephone or a keyboard, while a short term application driven temporary service level request change may be automatically generated by CPU 226 due to execution of specific application routines 236, 238, 240. For example, if the user of computer 204 is operating on voice application software 238, and is communicating over DSL 244 via CPE DSL modem 222 at a relatively low assigned data rate, e.g., bandwidth, and now decides to start a video conference using video conference software 238, an automatic request for increased bandwidth may be generated. Similarly, after the videoconference is over and software 236 terminates, a request for a decrease in bandwidth may be generated. This short term or temporary service level change capability, in accordance with the invention, would allow for additional "bandwidth-on-demand" requests dynamically providing, "on-the-fly" data rate changes without an interruption in service.

Computer 204 sends the service level change request to the provisioning system 210 in the central office 202. The service level change requests may be via telephone modem 224 over link 246 to the provisioning system 210, or the request may be sent through CPE DSL modem 222, DSL line 244, DSLAM DSL modem 208, and central office but 218 to provisioning system 210 in the normal data flow thru DSL modem 208. Provisioning system 210 receives and processes service level request changes from customers, e.g., the user of computer 204. The provisioning system 210 notifies the DSLAM modem 208 and/or the billing system 212 of the service level change request. The DSLAM modem 208 in conjunction with the CPE DSL modem 222, via line measurements, e.g., SNR and ATN, and the interchange of information with modem 222, determines the maximum achievable DSL line 244 data rate. Then the DSLAM modem 208 determines if the line data rate requested, via the provisioning change request, can be supported, and if possible, assigns a new line data rate, communicates that new rate to the CPE DSL modem 222, communicates the change in data rate to the billing system 212, and implements the new data rate dynamically, without the interruption in communications between DSLAM modem 208 and CPE DSL modem 222 or the need to reinitialize and resynchronize, in accordance with the present invention.

The DSLAM CPU periodically checks the condition of the DSL line 244 for noise margin based on line condition measurements, e.g., SNR and ATN measurements, performed by the DSLAM modem 208 and/or the CPE DSL modem 222 during normal communications. If the noise margin is determined to be low by either the DSLAM modem 208 or the CPE DSL modem 222, the DSLAM modem 208 can, in accordance with the invention, dynamically change the assigned data rate to a lower value before synchronization is lost, convey the new assigned value to the CPE DSL modem 222 and the billing system 212, and implement the new data rate on DSL line 244 dynamically without re-initialization or an interruption in service. If the noise margin is determined to be high enough to support an increased data rate, and the user is subscribed/provisioned for the higher data rate, the DSLAM modem 208 can, in accordance with the invention dynamically change the assigned data rate to a higher value, convey the new assigned value to the CPE DSL modem 222 and the billing system 212, and implement the new data rate on DSL line 244 dynamically without re-initialization or an interruption in service. Therefore, DSLAM modem 208 in conjunction with CPE DSL modem 222, via noise margin monitoring and signaling exchanges, is able to identify and dynamically adjust (up or down), without interruption of service, loss of synchronization, re-initialization, or re-power, the DSL data rate to operate at the highest service level currently provisioned which is currently achievable.

Figure 3:
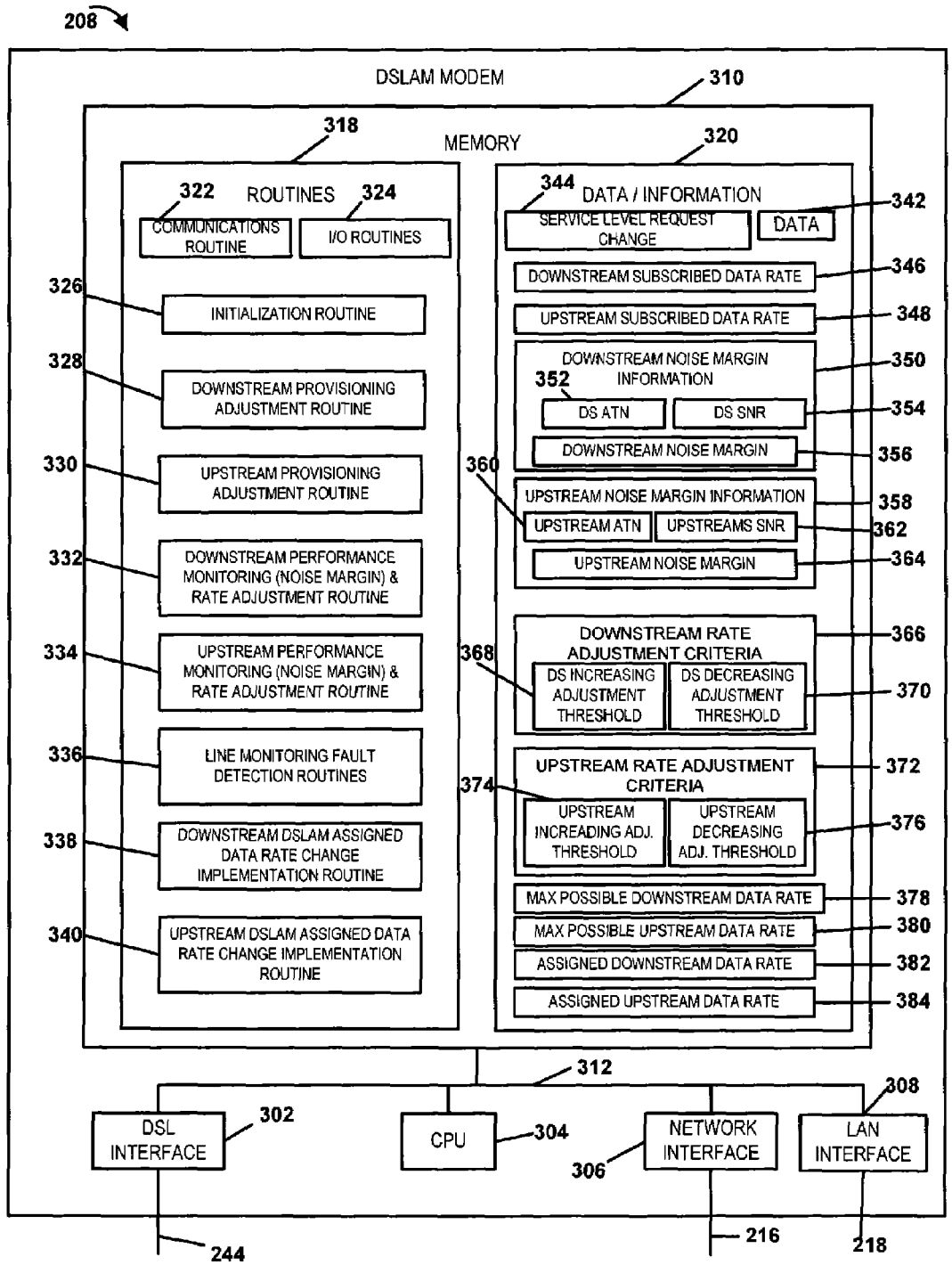
FIG. 3 illustrates a more detailed representation of the exemplary DSLAM modem shown in the system of FIG. 2, implemented in accordance with the present invention.

FIG. 3 provides a more detailed representation of the DSLAM Modem 208, implemented in accordance with the present invention, of the exemplary DSL communications system 200 of FIG. 2. DSLAM modem 208 includes a DSL interface 302, a CPU 304, a network interface 306, a LAN interface 308, and memory 310 coupled together via bus 312 over which the various elements 302, 304, 306, 308, 310 can interchange data and information. Memory 310 includes routines 318 and data/information 320. DSL interface 302 provides a port coupled to DSL line 244 providing the DSL connection to a CPE DSL modem 222. The DSL line data rate through interface 302 is controlled in accordance with the methods of the present invention. In general, the DSL line data rate in terms of provisioning, noise margin monitoring, requested rate changes, and assigned rate changes may be handled independently for the upstream direction and the downstream direction. The upstream direction is defined as data/information flow direction from the CPE DSL modem 222 to the DSLAM modem 208, while the downstream direction is defined as the data/information flow direction from the DSLAM modem 208 to the CPE DSL modem 222. Typically, the SNR and ATN for each DSL line directional flow are measured by the destination device of the data/information flow, e.g., DSLAM modem 208 monitors upstream signal flow SNR and ATN, while CPE DSL modem 222 monitors downstream signal flow SNR and ATN. Measured information may be interchanges between the two devices 208 and 222. Requests for changes in data rates may be made by CPE DSL modem 222, however, assignments of upstream and downstream data rates are made by DSLAM modem 208. CPU 304 executes the routines 318 and uses the data/information 320 included in memory 310, to control the basic functionality and implement the new features of the invention in the modem 208. Network interface 306 couples DSLAM modem 208 via link 216 to the central office network interface 214 and to the INTERNET. LAN interface 308 couples DSLAM modem 208, via central office bus 218, to provisioning system 210 and billing system 212. DLAM modem 208 can receive service level change requests and forward assigned data rate information through LAN interface 308.

Routines 318 includes communications routines 322, I/O routines 324, initialization routine 326, downstream provisioning adjustment routine 328, upstream provisioning adjustment routine 330, downstream performance monitoring (noise margin) & rate adjustment routine 332, upstream performance monitoring (noise margin) and rate adjustment routine 334, line monitoring fault detection routines 336, downstream DSLAM assigned data rate change implementation routine 338, and upstream DSLAM assigned data rate change implementation routine 340.

Data/Information 320 includes data 342, service level request change information 344, downstream subscribed data rate information 346, upstream subscribed data rate information 348, downstream noise margin information 350 upstream noise margin information 358, downstream rate adjustment criteria 366, upstream rate adjustment criteria 372, maximum possible downstream data rate 378, maximum possible upstream data rate 380, assigned downstream data rate 382, and assigned upstream data rate 384.

Data 342 includes user data, e.g., voice, video, and data files transmitted upstream via DSL line 244 to DSLAM modem 308 from user of computer 204 at a customer site or voice, video, data files intended to be transmitted by DSLAM modem 208 downstream via DSL line 244 to a user of computer 204. Service level request change information 344 includes information received by modem 208 from provisioning system 210 which may trigger activation of the downstream or upstream provisioning adjustment routines 328, 330. Service level change request information 344 may also include information defining the type of change request, e.g., upstream/downstream, long term subscriber profile type change/short term application driven data rate on demand type change, specific rate change level, and specific duration for requested change to be implemented. Downstream subscribed data rate 346 is the current maximum DSL downstream data rate that DSLAM modem 208 may assign for the user of CPE DSL modem 222 based on provisioning system 210 authorization. Upstream subscribed data rate 348 is the current maximum DSL upstream data ratio that DSLAM modem 208 may assign for the user of CPE DSL modem 222 based on provisioning system 210 authorization. The provisioning system 210 supplies downstream/upstream subscribed data rate information 346, 348 to DSLAM modem 208. In accordance with the invention, the downstream/upstream subscribed data rates 346, 348 may change dynamically, as service level requests are processed, during communication sessions between users without interruptions of service. Downstream noise margin information 350 includes downstream ATN 352, downstream SNR 354, and downstream noise margin 356. Downstream ATN 352 is the downstream signal attenuation measured at CPE DSL modem 222, while downstream SNR 354 is the downstream SNR measured at the CPE DSL modem 222. In some embodiments, downstream noise margin 356 is an ensemble of the downstream ATN 352, the downstream SNR 354, and/or other downstream line quality information collected where filtering and/or weighting may have been used to determine the downstream noise margin value(s) 356. In other embodiments, the SNR 354, by itself, is used as the downstream noise margin. Upstream noise margin information 358 includes upstream ATN 360, upstream SNR 362, and an upstream noise margin 364. Upstream ATN 360 is the upstream signal attenuation measured at DSLAM modem 208, while upstream SNR 362 is the upstream SNR measured at the DSLAM modem 208. In some embodiments, upstream noise margin 364 is an ensemble of the upstream ATN 360, the upstream SNR 362, and/or other line quality information collected where filtering and/or weighting may have been used to determine the upstream noise margin value(s) 364. In other embodiments the SNR 362, by itself, is used as the upstream noise margin. Downstream and upstream line rates may be controlled using separate adjustment thresholds or the same thresholds depending on the embodiment.

Downstream rate adjusting criteria 366 includes a downstream increasing adjusting threshold 368 and a downstream decreasing adjustment threshold 370. The downstream increasing adjustment threshold 370 is a pre-defined level, which when exceeded by the downstream noise margin 356, may result in a dynamic downstream data rate increase without interruption of service. The downstream increasing threshold may be, e.g., an SNR of 15 dB in a system where an SNR of 6 dB causes a loss of synchronization while an exemplary downstream decreasing threshold may be, e.g., 9 dB.

The downstream decreasing adjustment threshold 370 is used to trigger a decrease in the downstream line rate when the measured SNR drops below the threshold. The downstream decreasing adjustment threshold 370 is a pre-defined level. When it is detected that the downstream noise margin 356 has dropped below the downstream decreasing adjustment threshold 370, the downstream data rate is decreased, without interruption of service, e.g., without performing a resynchronization operation.

Upstream rate adjusting criteria 372 includes an upstream increasing adjusting threshold 374 and an upstream decreasing adjustment threshold 376. The upstream increasing adjustment threshold 374 is a pre-defined level, which when exceeded by the upstream noise margin 364, results in a dynamic upstream data rate increase without interruption of service, e.g., without performing a resynchronization operation. The upstream decreasing adjustment threshold 376 is a pre-defined level. When it is detected that the upstream noise margin 364 has dropped below the upstream decreasing adjustment threshold 376, the upstream data rate may decreased, without interruption of service. In some embodiments, downstream noise margin information 350 and/or the downstream rate adjustment criteria 366 may not be included in the DSLAM modem 208, as in such cases the CPE DSL modem 222 performs the downstream performance monitoring and evaluation, subsequently forwarding data rate downstream change requests to DSLAM modem 208. Maximum possible downstream data rate 378 is the determined maximum achievable downstream data rate that could be assigned while still maintaining synchronization and maintaining a specified Bit Error Rate (BER), based upon the downstream noise margin measurements 356. Maximum possible upstream data rate 380 is the determined maximum achievable upstream data rate that could be assigned while still maintaining synchronization and maintaining a specified Bit Error Rate (BER), based upon the upstream noise margin measurements 364. Assigned downstream data rate 382 is the operational downstream data rate which is controlled and set by the DSLAM modem 208 and conveyed to the CPE DSL modem 222. Assigned downstream data rate 382 is limited by both the downstream subscribed data rate 346 and the maximum possible downstream data rate 378. Assigned upstream date rate 384 is the operational upstream data rate which is controlled and set by the DSLAM modem 208 and conveyed to the CPE DSL modem 222. Assigned upstream data rate 384 is limited by both the upstream subscribed date rate 348 and the max possible upstream date rate 380.

Communications routines 322 include the protocols, e.g., T1.413 and ITU G.dmt (G.hs) used by the DSLAM modem 208 in communications with CPE DSL modems 222. I/O routines 324 may control operation of the various interfaces: DSL interface 302, network interface 306, and LAN interface 308. I/O routines 324 may be invoked by other routines to control the transfer of information, e.g., downstream noise margin information 350 and service level request change information 344, the dynamic resetting of port configurations, e.g., when directed to use a new assigned downstream/upstream data rate 382, 384.

Initialization routine 326 controls the initialization sequence or modem training, communication and negotiation of capabilities, and the training of the transceivers, e.g., in DSL interface 302 using the negotiated parameters. The negotiation of capabilities may involve: sending test signals on the DSL line, measuring SNR and ATN at the receiving end of the DSL, obtaining initial values for maximum possible downstream/upstream rates 378, 380, transferring initial downstream/upstream subscribed data rate information 346, 348 from the provisioning system 210, and calculating and assigning initial maximum possible downstream/upstream rate values 378, 380.

Downstream provisioning adjustment routine 328 in DSLAM modem 208 works in coordination with a downstream provisioning adjustment routine 422 (FIG. 4) in CPE DSL modem 222 to respond to a service level request change 344, and using downstream noise margin info 360 determines a maximum possible downstream rate 378 for the given line conditions. Then routine 328 determines, using the current downstream subscribed data rate 346, whether a new downstream data rate should be set by the DSLAM modem 208. Upstream provisioning adjustment routine 330 in DSLAM modem 208 responds to a service level request change 344, and using upstream noise margin 364, determines a maximum possible upstream rate 380 for the given line conditions, and then determines, using the current upstream subscribed data rate 348, whether a new upstream data rate should be set by the DSLAM modem 208. In accordance with the invention, downstream/upstream provisioning adjustment routines 328, 330 may control dynamic service level (data rate) changes in either direction (up/down), during a communication session, without a disruption in service.

Downstream performance monitoring (noise margin) & rate adjustment routine 332 in DSLAM modem 308 operates in conjunction with downstream performance monitoring (noise margin) & rate adjustment routine 424 in CPE DSL modem 222 to monitor downstream ATN 352 and downstream SNR 354 obtaining downstream noise margin 356, evaluating whether the downstream noise margin 356 has exceeded boundaries defined by the downstream rate increasing adjustment threshold 368 and the downstream rate decreasing adjustment threshold 370, and generating a request for a new downstream data rate, if so directed. Downstream performance monitoring (noise margin) & rate adjustment routine 332 repeats on an ongoing basis, e.g., periodically, during normal operation, providing for the periodic checking of the DSL downstream line quality to identify whether a higher downstream rate, prescribed per the downstream subscribed data rate 346 is achievable or whether the current assigned downstream data rate 382 is not sustainable. Routine 332 thus identifies downstream data rate adjustments that may be made so that the customer may achieve the highest possible throughput on their DSL line 244 consistent with their prescribed service rate 346. In accordance with the invention, the downstream performance monitoring (noise margin) & rate adjustment routine 322 regulates the assigned downstream data rate 382 in both directions (up/down) as line conditions change without disrupting normal operations or service.

Upstream performance monitoring (noise margin) & rate adjustment routine 334 monitors upstream ATN 360 and upstream SNR 362, obtains an upstream noise margin 364, evaluates whether the upstream noise margin 364 has exceeded boundaries defined by the upstream rate increasing adjustment threshold 374 and the upstream rate decreasing adjustment threshold 376, and generates a request for a new upstream data rate, if so directed. Upstream performance monitoring (noise margin) & rate adjustment routine 334 repeats on an ongoing basis, e.g., periodically, during normal operation, providing for the periodic checking of the DSL upstream line quality to identify whether a higher upstream rate, prescribed per the upstream subscribed data rate 348 is achievable, or whether the current assigned upstream data rate 384 is not sustainable. Routine 334 thus identifies upstream data rate adjustments that may be made so that the customer may achieve the highest possible throughput on their DSL line 244 consistent with their prescribed service rate 348. In accordance with the invention, the upstream performance monitoring (noise margin) & rate adjustment routine 334 regulates the assigned upstream data rate 384 in both directions (up/down) ad line conditions change without disrupting normal operations or service.

Line monitoring fault detection routines 336 monitors the DSL line for loss of signal, loss of frame, loss of power, and processes information from CPE DSL 222 indicating far-end loss-of signal, far-end remote failure indication, and far-end loss-of power. Due to fault indications, routine 336 may evoke the initialization routine 326 to attempt to reestablish valid communications with CPE DSL modem 222.

Downstream DSLAM assigned data rate change implementation routine 338 in DSLAM modem 208 in conjunction with downstream DSLAM assigned data rate change implementation routine 428 in CPE DSL modem 222 controls the implementation of rate changes called for as output from the downstream provisioning adjustment routine 328 and/or the downstream performance monitoring (noise margin) & rate adjustment routines 332, 424. The implementation of the rate change is performed via a signaling exchange between DSLAM modem 208 and CPE DSL modem 222. Assignment routine 338 directs DSLM modem 208 to set the new assigned downstream data rate 382, signals the new rate to the CPE DSL modem 222, and activates the new data transfer rate. The transition to the new assigned downstream data rate 382 shall be performed dynamically without disrupting normal operations or service, in accordance with the invention.

Upstream DSLAM assigned data rate change implementation routine 340 in DSLAM modem 208 in conjunction with upstream DSLAM assigned data rate change implementation routine 430 in CPE DSL modem 222 controls the implementation of rate changes called for as output from the upstream provisioning adjustment routine 330 and/or the upstream performance monitoring (noise margin) & rate adjustment routine 334. The implementation of the rate change shall be performed via a signaling exchange between DSLAM modem 208 and CPE DSL modem 222. Assignment routine 340 directs DSLAM modem 208 to set the new assigned upstream data rate 384, signals the new rate to the CPE DSL modem 222, and activates the new data transfer rate. The transition to the new assigned downstream data rate 384 shall be performed dynamically without disrupting normal operations or service, in accordance with the invention.

Figure 4:
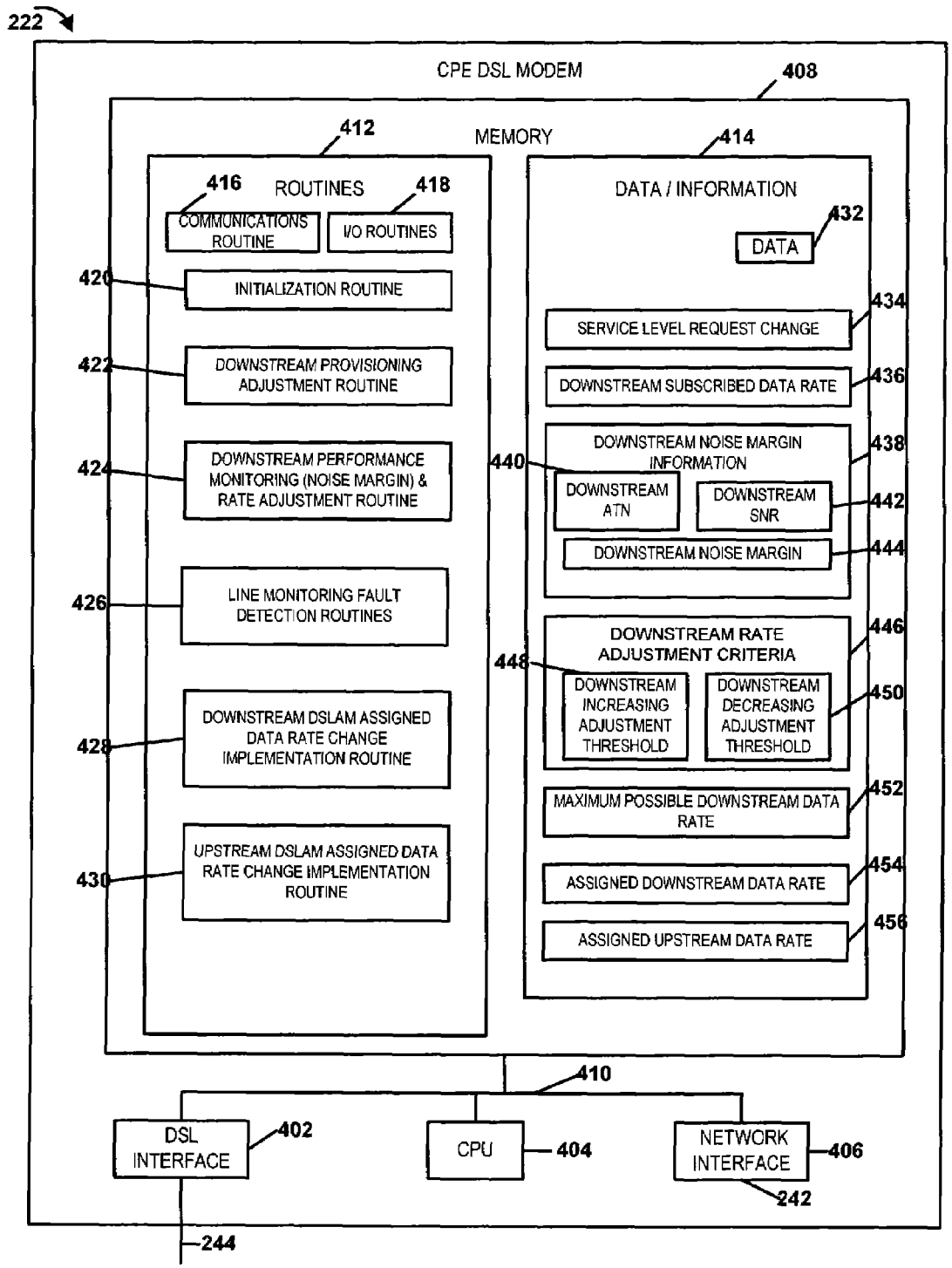
FIG. 4 illustrates a more detailed representation of the exemplary CPE DSL modem shown in the system of FIG. 2, implemented in accordance with the present invention.

FIG. 4 provides a more detailed representation of the CPE DSL Modem 222, implemented in accordance with the present invention, of the exemplary DSL communications system 200 of FIG. 2. CPE DSL modem 222 includes a DSL interface 402, a CPU 404, a network interface 406, and memory 408 coupled together via bus 410 over which the various elements 402, 404, 406, 408, and 410 can interchange data and information. Memory 410 includes routines 412 and data/information 414. DSL interface 402 provides a port coupled to DSL line 244 providing the DSL connection to DSLAM DSL modem 208. The DSL line data rate through interface 402 is controlled in accordance with the methods of the present invention. CPU 404 executes the routines 412 and uses the data/information 414 included in memory 408, to control the basic functionality and implement the new features of the invention in the modem 222. Network interface 406 couples CPE DSL modem 222 via bus 242 (note: in the figure, bus 242 needs to extend outside the 222 box) to the other elements 226, 228, 230, 224, and 232 of computer 204.

Routines 412 includes communications routines 416, I/O routines 418, initialization routine 420, downstream provisioning adjustment routine 422, downstream performance monitoring (noise margin) & rate adjustment routine 424, line monitoring fault detection routines 426, downstream DSLAM assigned data rate change implementation routine 428, and upstream DSLAM assigned data rate change implementation routine 430.

Data/Information 414 includes data 432, service level request change information 434, downstream subscribed data rate 436, downstream noise margin information 438, downstream rate adjustment criteria 446, maximum possible downstream data rate 452, assigned downstream data rate 454, and assigned upstream data rate 456.

Data 432 includes user data, e.g., voice, video, data files to be transmitted upstream via DSL line 244 to DSLAM modem 208 intended for a peer user at a different site, and received user data, e.g., voice, video, data files originally sourced from a peer user and transmitted by DSLAM modem 208 downstream via DSL line 244 to CPE DSL modem 222. Service level request change information 434 includes information received by modem 222 originally from provisioning system 210 which may trigger activation of the downstream provisioning adjustment routine 422. Service level change request information 434 may also include information defining the type of change request, e.g., long term subscriber profile type change/short term application driven data rate on demand type change, specific rate change level, and specific duration for the requested change to be implemented. Downstream subscribed data rate 436 is the current maximum DSL downstream data that DSLAM modem 208 may assign. The provisioning system 210 is the original source of the downstream subscribed data rate information 436 which has been forwarded to modem 222. In accordance with the invention, the downstream subscribed data rate 436 may change dynamically, as service level requests are processed, during communication sessions between users without interruptions of service. Downstream noise margin information 438 includes downstream ATN 440, downstream SNR 442, and downstream noise margin 444. Downstream ATN 440 is the downstream signal attenuation measured at CPE DSL modem 222, while downstream SNR 442 is the downstream SNR measured at CPE DSL modem 222. Downstream noise margin 444 represents an ensemble of the downstream ATN 440, the downstream SNR 442 and/or other line measurements, where filtering and/or weighting may have been used to determine the downstream noise margin value 444. Dowstream rate adjusting criteria 446 includes a downstream increasing adjusting threshold 448 and a downstream decreasing adjustment threshold 450. The downstream increasing adjustment threshold 448 is a pre-defined level, which when exceeded by the downstream noise margin 444, may result in a dynamic downstream data rate increase without interruption of service. The downstream decreasing adjustment threshold 450 is a pre-defined level. If it is detected that the downstream noise margin 444 has dropped below the downstream decreasing adjustment threshold 450, then a dynamic downstream data rate decrease may occur without an interruption in service. Maximum possible downstream data rate 452 is the determined maximum achievable downstream data rate that could be assigned while still maintaining synchronization and maintaining a specified Bit Error Rate (BER), based upon the downstream noise margin information 438. Assigned downstream data rate 454 is the operational downstream data rate which is controlled and set by the DSLAM modem 208 and has been conveyed to the CPE DSL modem 222. Assigned downstream data rate 454 is limited by both the downstream subscribed rate 436 and the maximum possible downstream data rate 452. Assigned upstream data rate 456 is the operational upstream data rate which is controlled and set by the DSLAM modem 208 and has been conveyed to the CPE DSL modem 222.

Communications routines 416 include the protocols, e.g., T1.413 and ITU G.dmt(G.hs) used by the CPE DSL modem 222 in communications with DSLAM modem 208. I/O routines 418 may control operation of the various interfaces: DSL interface 402 and network interface 406. I/O routines 418 may be invoked by other routines to control the transfer of information, e.g., downstream noise margin information 438 and service level request change 434, and the dynamic resetting of port configurations, e.g., when directed to use a new assigned downstream-upstream data rate 454, 456. Initialization routine 420 controls the initialization sequence or modem training, communication and negotiation of capabilities, and the training of the transceivers, e.g., in DSL interface 402 using the negotiated parameters. The negotiation of capabilities may involve: the sending of test signals on the DSL line, the measurement of SNR and ATN at the receiving end of the DSL line, obtaining initial values for maximum possible downstream data rates 452, the transfer of initial downstream subscribed data rate 436 originating from the provisioning system 210, and the reception of initial assigned downstream/upstream rate values 454, 456.

Downstream provisioning adjustment routine 422 in CPE DSL modem 222 works in coordination with a downstream provisioning adjustment routine 328 in DSLAM modem 208 to respond to a service level request change 434, and using downstream noise margin information 438, determines a maximum possible downstream data rate 452 for the given line conditions, and then determines, using the current downstream subscribed data rate 436, whether a new downstream data rate should be set by the DSLAM modem 208. In accordance with the invention, downstream provisioning adjustment routine 422 may forward downstream data rate change requests to DSLAM modem 208 for dynamic service level (data rate) changes in either direction (up/down), during a communication session, without a disruption in service.

Downstream performance monitoring (noise margin) & rate adjustment routine 424 in CPE DSL modem 222 operates in conjunction with downstream performance monitoring (noise margin) & rate adjustment routine 332 in DSLAM modem 208 to monitor downstream ATN 440 and downstream SNR 442 obtaining a downstream noise margin 444, evaluating whether the downstream noise margin 444 has exceeded boundaries defined by the downstream increasing adjustment threshold 448 and the downstream decreasing adjustment threshold 450, and generating a request for a new downstream data rate, if so directed. Downstream performance monitoring (noise margin) & rate adjustment routine 424 repeats on an ongoing basis, e.g. periodically, during normal operation, providing form the periodic checking of the DSL downstream line quality to identify whether a higher downstream rate, prescribed per the downstream subscribed data rate 436 is achievable or whether the current assigned downstream data rate 454 is not sustainable. Routine 424 thus identifies downstream data rate adjustments that may be made so that the customer may achieve the highest possible throughput on their DSL line 244 consistent with their downstream subscribed service rate 436, and forwards those requests to DSLAM DSL modem 208. In accordance with the invention, the downstream performance monitoring (noise margin) & rate adjustment routine 424 regulates the assigned downstream data rate 454 in both directions (up/down) as line conditions change without disrupting normal operations or service.

Line monitoring fault detection routines 426 monitors the DSL line 244 for loss of signal, loss of frame, loss of power, and far-end loss of signal. Due to fault indications, routine 426 may evoke the initialization routine 420 to attempt to reestablish valid communications with DSLAM modem 208.

Downstream DSLAM assigned data rate change implementation routine 428 in CPE DSL modem 222 receives new assigned downstream data rates 454 from the downstream DSLAM assigned data rate change implementation routine 338 in DSLAM 208, acknowledges reception, and transitions to the new data rate. The transition to the new assigned downstream data rate 454 shall be performed dynamically without disrupting normal operations or service, in accordance with the invention.

Upstream DSLAM assigned data rate change implementation routine 430 in CPE DSL modem 222 receives new assigned upstream data rates 456 from the upstream DSLAM assigned data rate change implementation routine 340 in DSLAM modem 208, acknowledges reception, and transitions to the new data rate. The transition to the new assigned upstream data rate 456 shall be performed dynamically without disrupting normal operations or service, in accordance with the invention.

Figure 5:
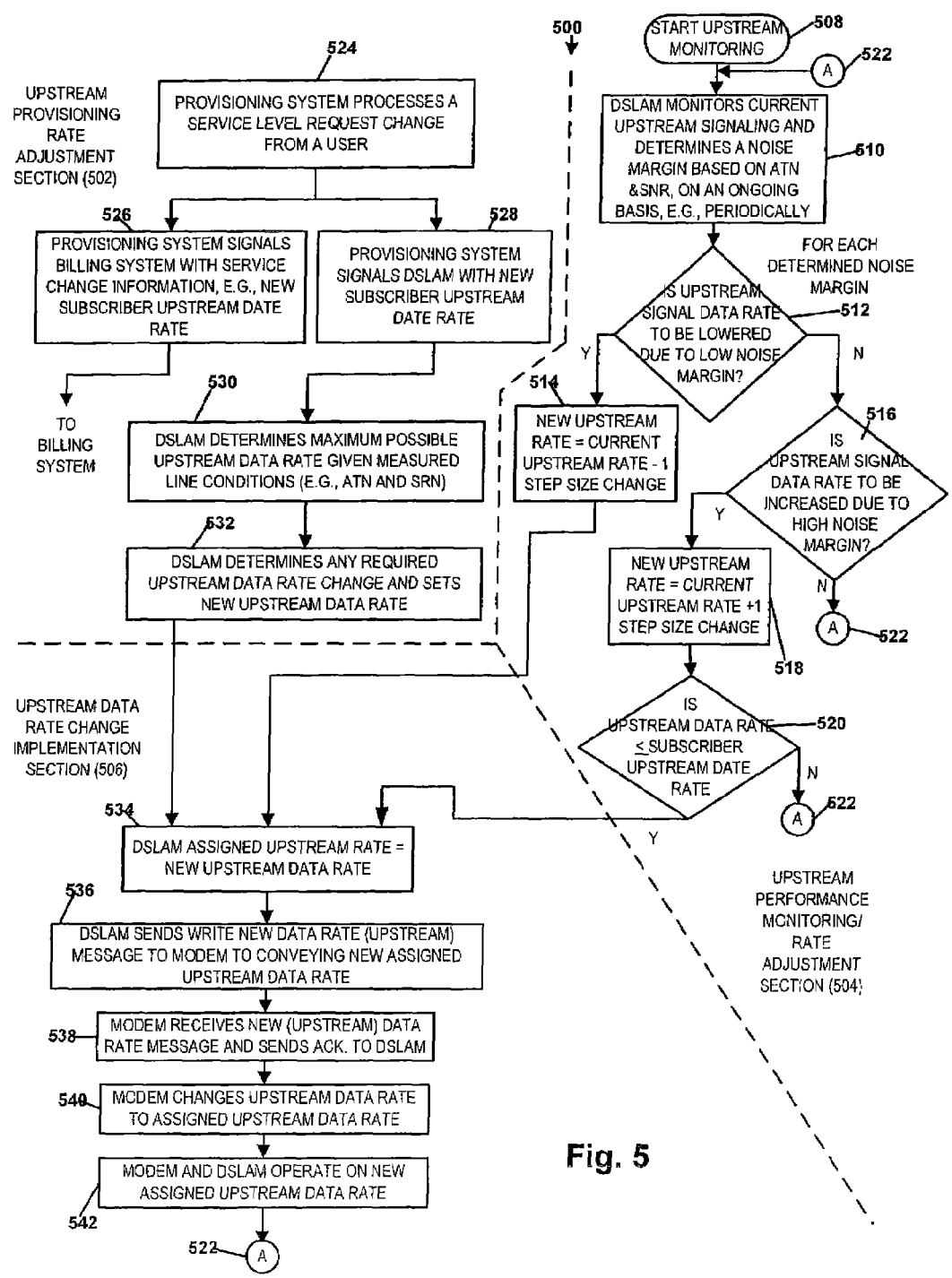
FIG. 5 shows a flowchart illustrating a method of dynamic upstream DSL modem data rate adjustment, in accordance with the present invention.
Figure 6:
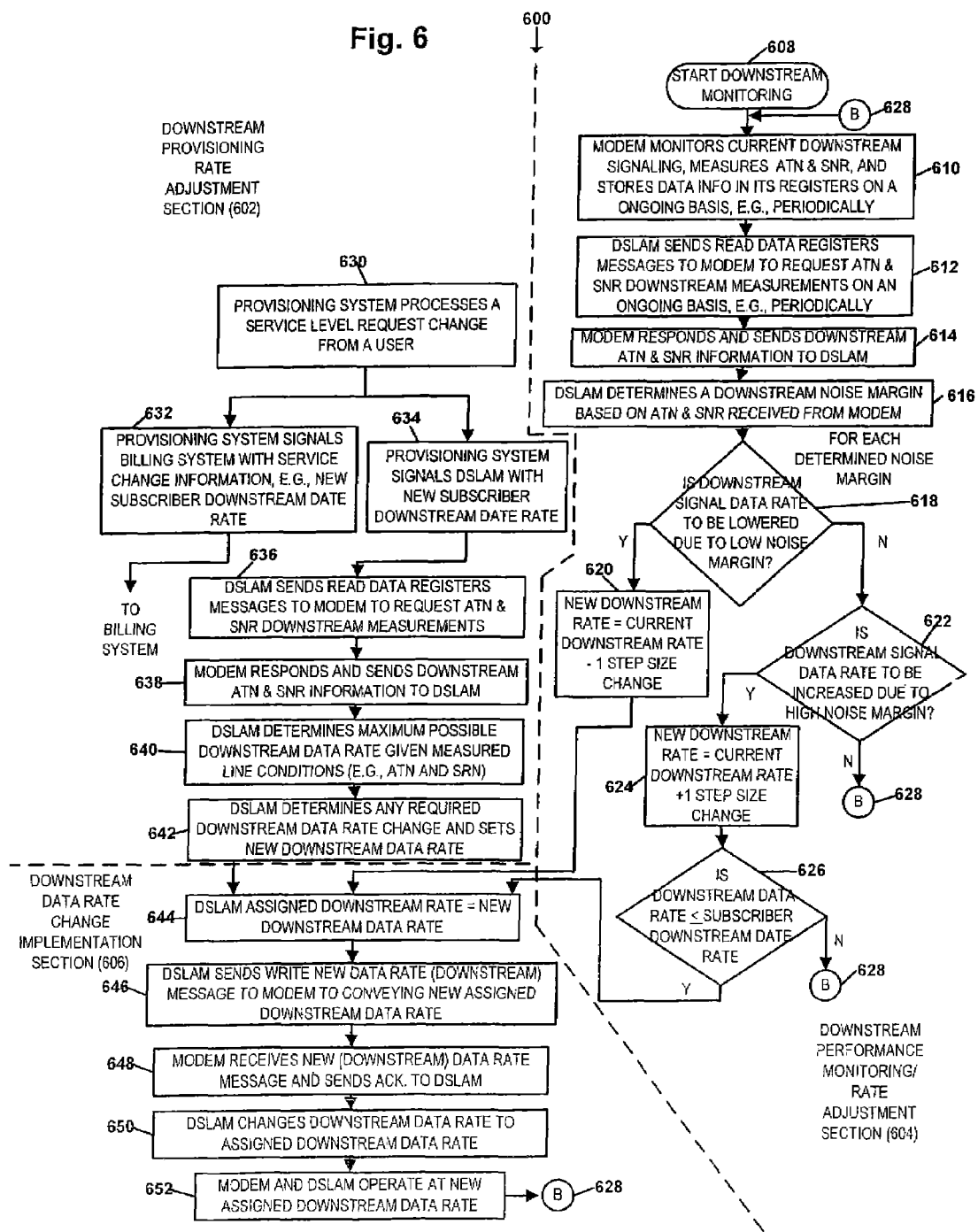
FIG. 6 shows a flowchart illustrating a method of dynamic downstream DSL modem data rate adjustment, in accordance with the present invention.
Figure 7:
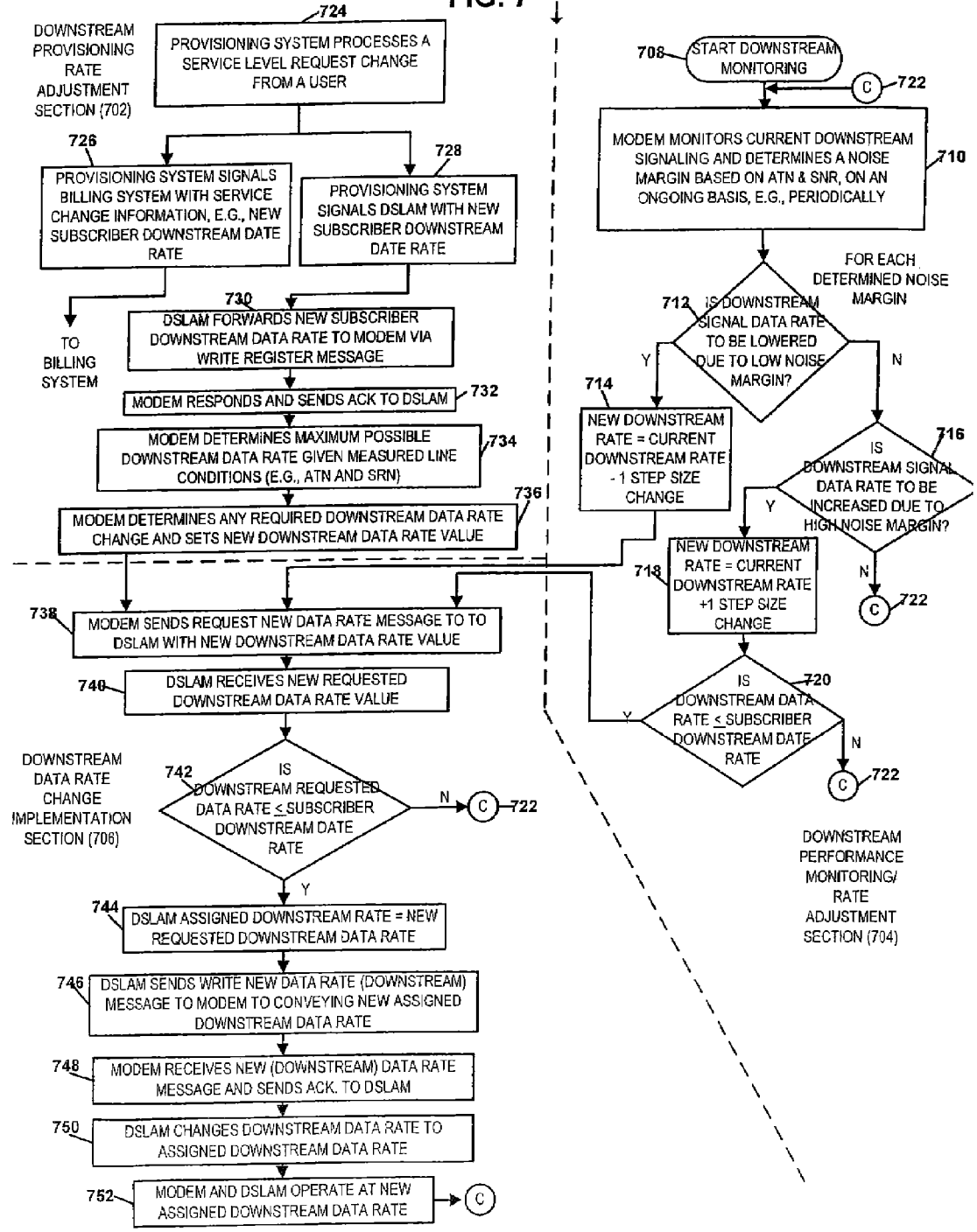
FIG. 7 shows a flowchart illustrating another method of dynamic downstream DSL modem data rate adjustment, in accordance with the present invention.

FIGS. 5-7 illustrate flow charts implementing the methods of the present invention. With respect to the flow charts of FIGS. 5-7, the following shorthand notation is used for convenience, DSLAM=DSLAM modem, and MODEM=CPE DSL modem.

FIG. 5 shows a flowchart 500 illustrating a method of dynamic upstream DSL modem data rate adjustment, in accordance with the present invention. Flow chart 500 is subdivided into 3 major subsections: the upstream provisioning rate adjustment section 502, the upstream performance monitoring/rate adjustment section 504, and the upstream data rate change section 506. Upstream provisioning rate adjustment section 502 is performed under the control of the upstream provisioning adjustment routine 330 in DSLAM modem 208. Upstream performance monitoring/rate adjustment section is performed under the direction of the upstream performance monitoring (noise margin) & rate adjustment routine 334 in DSLAM modem 208. The upstream data rate change implementation section is controlled by the upstream DSLAM assigned data rate change implantation routines 340, 430 in modems 208, 222.

Following completion of modem initialization and selection of an assigned upstream data rate 384, subsection 504 is activated, and the upstream performance monitoring starts in step 508. Operation proceeds to step 510, where DSLAM modem 208 monitors the current upstream signaling and determines an upstream noise margin 364 based upon measured upstream ATN 360 and upstream SNR 362. The upstream noise margin 364 is determined on an ongoing basis, e.g., periodically. The time intervals between new determinations of the upstream noise margin 364, e.g., 1 ms to 1 hr, may be determined by a number of settings in the configuration parameters stored in the DSLAM modem 208 and/or the CPE DSL modem 202. Proceeding to step 512, for each determined upstream noise margin 364, a test is made as to whether the upstream signal data rate, e.g., the assigned upstream data rate 384, should be lowered due to a low noise margin. The test involves comparing the upstream noise margin 364 to the upstream decreasing adjustment threshold 376. The upstream decreasing adjustment threshold 376 has been pre-selected at a level which will result in a transition to a lower upstream assigned data rate 384, before synchronization is lost, resulting in smooth dynamic transitions to the lower rate. If the upstream noise margin 364 is lower than the upstream decreasing adjustment criteria 376, then flow proceeds to step 514, where a new upstream rate is calculated by decrementing the current assigned upstream rate 384 by one step size. The new upstream data rate will be forwarded to step 534 of the upstream data rate change implementation section 506. However, in step 512, if the upstream noise margin 364, exceeds the upstream decreasing adjustment threshold 376, it has been determined that the upstream noise margin 364 is at least high enough to support the current upstream assigned rate 384, and so operation proceeds to step 516. In step 516, the upstream noise margin 364 is tested against the upstream increasing adjustment threshold 374 to determine if there is sufficient margin to ratchet up the assigned upstream data rate 384. If the upstream noise margin 364 exceeds the upstream increasing adjustment threshold 374, the line conditions can support a higher data rate, and therefore flow proceeds to step 518. In step 518, a new upstream data rate is calculated by increasing the current assigned upstream data rate 384 by one step size. Next, in step 520, the new upstream data rate is compared to the upstream subscribed data rate 348. If the new upstream data rate is ≦ the upstream subscriber rate 348, then the new upstream data rate is forwarded to step 534 of the upstream data rate change implantation section 506; otherwise flow returns to via connection node A 522 to step 510. Returning to step 516, if it was determined that the upstream noise margin 364 did not exceed the upstream increasing adjustment threshold 374, then the DSL is currently operating at the present maximum capacity and no action should be taken, so flow proceeds via connection node 522 back to step 510.

In parallel to the noise monitoring of section 504, the upstream provisioning rate adjustment section 502 may be executed. Operation starts in step 524 where the provisioning system 210, processes a service level request change from a user. The service level request change may be either a provisioning request, e.g., a subscriber profile change, or an application-driven temporary service level request for a change in change in bandwidth, e.g., on-demand high bit rate services. The request may have been routed to the provisioning system via communications through telephone modem 224 or through MODEM 222; however, in either case, services are not interrupted by the request. As a result of step 524, the provisioning system 210, signals the billing system 212 providing notification of the change in user service level, and the provisioning system 210 also signals the DSLAM 208 by sending the service level request change 344 and the new upstream subscribed data rate 348. Next in step 530, the DSLAM 208, determines the maximum possible upstream data rate 380 using the current upstream noise margin information 358, e.g., upstream ATN 360 and upstream SNR 362. In step 532, the DSLAM 208 determines if the upstream assigned data rate 384 should be increased by evaluating if maximum possible upstream data rate 380 exceeds the current assigned upstream data rate 384 and does not exceed the upstream subscribed data rate 348. In step 532, the DSLAM modem determines if the assigned upstream data should be decreased if the new upstream subscribed data rate is below the current assigned upstream data rate 384. If dictated, a new upstream data rate is calculated in step 532 and forwarded to step 534 of the upstream data rate change implementation section 506. In some embodiments, the data rate—when increased—is increased in single step sizes. If it is determined in step 532, that the assigned upstream data rate cannot be changed at the present time, due to line conditions, no action is taken; however, the new upstream subscribed data rate 348 has been loaded into the DSLAM 208, allowing the upstream performance monitoring section 504 to make the adjustment to a new assigned upstream data rate 384, at a later time, whenever line conditions dictate that it is supportable.

The upstream data rate change implementation section 506 of flowchart 500 will now be described. In step 534, the DSLAM 208, receives a new requested upstream data rate, either from an output of the noise monitoring section 504 in steps 514 or 520 or from the provisioning section 502 in step 532, and sets the DSLAM assigned upstream data rate 384 to the new requested value. Proceeding to step 536, the DSLAM 208 conveys the new assigned upstream data rate 384 to the MODEM 222 via, e.g., a write new data rate message. MODEM 222 stores the new data rate as assigned upstream data rate 456 and sends an acknowledgement signal back to DSLAM 208. The MODEM 222 changes to operate at the new upstream assigned data rate 456 in step 540. In step 542, the MODEM 222 and the DSLAM 208 operate at the new data rate, the transition having been without interruption of service, in accordance with the invention. Next flow proceeds via connection node A 522 back to performance monitoring of step 510, where new noise margin are determined.

FIG. 6 shows a flowchart 600 illustrating a method of dynamic downstream MODEM data rate adjustment, in accordance with the present invention. Flow chart 600 is subdivided into 3 major subjections: the downstream provisioning rate adjustment section 602, the downstream performance monitoring/rate adjustment section 604, and the downstream data rate change implementation section 606. The downstream provisioning rate adjustment section 602 is performed under the control of the downstream provisioning adjustment routines 328, 422 in DSLAM 208 and in MODEM 222. The downstream performance monitoring/rate adjustment section 604 is performed under the direction of the downstream performance monitoring (noise margin) & rate adjustment routines 332, 424 in modems 208, 222. The downstream data rate change implementation section 606 is controlled by the downstream DSLAM assigned data rate change implementation routines 338, 428 in modems 208, 222.

Following completion of modem initialization and selection of a downstream assigned data rate 382, subsection 604 is activated, and the downstream performance monitoring starts in step 608. Operation proceeds to step 610, where MODEM 222 monitors the current downstream signaling, measures a downstream ATN 440 and a downstream SNR 442, and stores the information in its registers. The process of step 610 is repeated on an ongoing basis, e.g., periodically. In step 612, DSLAM 208, sends read data register messages to the MODEM 222, to request downstream ATN 440 and downstream SNR 442. The request of step 612 is performed on an ongoing basis, e.g., periodically. The rate chosen for measuring the ATN 440 and the SNR 442 in step 610 may be different than the rate chosen for accessing the information in step 612. In some embodiments, the rate of step 610 is at least twice the rate of step 612. The time intervals between successive measurements in step 610 and the time intervals between successive access requests of step 612 may be determined by a number of settings in the configuration parameters stored in the DSLAM 208 and/or the MODEM 202. In step 614, MODEM 222 responds and sends the requested information to the DSLAM 208, where the information is stored as downstream ATN 352 and downstream SNR 354. Next, in step 616, the DSLAM determines a downstream noise margin 356, based upon the ATN 352 and SNR 354. Proceeding to step 618, for each determined downstream noise margin 356, a test is made as to whether the downstream signal data rate, e.g., the assigned downstream data rate 382, should be lowered due to a low noise margin. The test involves comparing the downstream noise margin 356 to the downstream decreasing adjustment threshold 370. The downstream decreasing adjustment threshold 370 has been pre-selected at a level which will result in a transition to a lower downstream assigned data rate 382, before synchronization is lost, resulting in smooth dynamic transitions to the lower rate. If the downstream noise margin 356 is lower than the downstream decreasing adjustment criteria 370, then flow proceeds to step 620, where a new downstream rate is calculated by decrementing the current assigned downstream data rate 382 by one step size. In some embodiments, each step size may a uniform increment, e.g., 32 Kbps based upon the bin size specified by the standard, e.g., ITU G.922.1 G. DMT. The new downstream data rate will be forwarded to step 644 of the downstream data rate change implementation section 606. However, in step 618, if the downstream noise margin 356, exceeds the downstream decreasing adjustment threshold 370, it has been determined that the downstream noise margin 356 is at least high enough to support the current downstream assigned data rate 382, and so operation proceeds to step 622. In step 622, the downstream noise margin is tested against the downstream increasing adjustment threshold 368 to determine if there is sufficient margin to ratchet up the assigned downstream data rate 382. If the downstream noise margin 356 exceeds the downstream increasing adjustment threshold 368, the line condition can support a higher data rate, and therefore flow proceeds to step 624. In step 624, a new downstream data rate is calculated by increasing the current assigned downstream data rate 382 by one step size. Next, in step 626, the new downstream data rate is compared to the downstream subscribed data rate 346. If the new downstream data rate is ≦ the downstream subscribed data rate 346, then the new downstream data rate is forwarded to step 644 of the downstream data rate change implementation section 606; otherwise flow returns to via connection node B 628 to step 610. Returning to step 622, if it was determined that the downstream noise margin 356 did not exceed the downstream increasing adjustment threshold 368, then the DSL is currently operating at the maximum capacity and no action should be taken, so flow proceeds via connection node B 628 back to step 610.

In parallel to the noise monitoring of section 604, the downstream provisioning rate adjustment section 602 may be executed. Operation starts in step 630 where the provisioning system 210, processes a service level request change from a user. The service level request change may be either a provisioning request, e.g., a subscriber profile change, or an application driven temporary service level request for a change in change in bandwidth, e.g., on-demand high bit rate services. The request may have been routed to the provisioning system 210 via communications through telephone modem 224 or through MODEM 222; however, in either case, services are not interrupted by the request. As a result of step 630, the provisioning system 210 signals the billing system 212 providing notification of the change in user service level in step 632, and the provisioning system 210 also signals the DSLAM 208 by sending the service level request change 344 and the new downstream subscribed data rate 346 in step 634. Next, in step 636, DSLAM 208 sends read data register request messages to MODEM 222 to request downstream ATN 440 and downstream SNR 442. In step 638, MODEM 222 responds and sends the information to the DSLAM 208 where it is stored as downstream ATN 352 and downstream SNR 354. In step 640, DSLAM 208 determines the maximum possible downstream data rate 378 based on the given line conditions obtained in step 638. In step 642, the DSLAM 208 determines if the downstream assigned data rate 382 should be increased by evaluating if maximum possible downstream data rate 378 exceeds the current assigned downstream data rate 382 and does not exceed the downstream subscribed data rate 346. In step 642, the DSLAM modem 208 determines the assigned downstream data should be decreased if the new downstream subscribed data rate 346 is below the current assigned downstream data rate 382. If dictated, a new downstream data rate is calculated in step 642 and forwarded to step 644 of the downstream data rate change implementation section 606. In some embodiments, where an increase is called for, the data rate is increased in a single step size. If it is determined in step 642, that the assigned downstream data rate 382 cannot be changed at the present time, due to line conditions, no action is taken; however, the new downstream subscribed data rate 346 has been loaded into DSLAM 208, allowing the downstream performance monitoring section 604 to make the adjustment to a new assigned downstream data rate 382, at a later time, whenever line conditions indicate that it is supportable.

The downstream data rate change implementation section 606 of flowchart 600 will now be described. In step 644, the DSLAM 208, receives a new requested downstream data rate, either as output from the downstream performance monitoring/rate adjustment section 604 in steps 620 or 626 or as output from the downstream provisioning rate adjustment section 602 in step 642, and sets the DSLAM assigned downstream data rate 382 to the new requested value. Proceeding to step 646, the DSLAM 208 conveys the new assigned downstream data rate 382 to the MODEM 222 via, e.g., a write new data rate message. MODEM 222 stores the new data rate as assigned downstream data rate 454 and sends an acknowledgement signal back to DSLAM 208. The DSLAM 208 changes to operate at the new assigned downstream data rate 382 in step 650. In step 652, the MODEM 222 and the DSLAM 208 operate at the new data rate, the transition having been without interruption of service, in accordance with the invention. Next flow proceeds via connection node B 628 back to performance monitoring step 610, where new downstream ATN 440 and SNR 442 measurements are made.

FIG. 7 shows a flowchart 700 illustration another method of dynamic downstream DSL modem data rate adjustment, in accordance with the present invention. In the implementation of FIG. 7, the MODEM 222 determines any new downstream rates and sends a request, when a change in rate is called for, the DSLAM 208. In the implementation of FIG. 6, the MODEM 222 measures downstream signal line characteristics, which MODEM 222 sends on an ongoing basis to DSLAM 208; the DSLAM 208 uses the transferred line quality information to decide when a downstream data rate change should be requested. The approach of FIG. 7 has the advantage of potentially less signaling between modems 208 and 222, while the approach of FIG. 6 has less complexity in the MODEM 222. Flow chart 700 is subdivided into 3 major subjections: the downstream provisioning rate adjustment section 702, the downstream performance monitoring/rate adjustment section 740, and the downstream data rate change implementation section 706. The downstream provisioning rate adjustment section 702 is performed under the control of the downstream provisioning adjustment routines 328, 422 in modems 208, 222. The downstream performance monitoring/rate adjustment section 704 is performed under the direction of the downstream performance monitoring (noise margin) & rate adjustment routines 332, 424 in modems 208, 222. The downstream data rate change implementation section 706 is controlled by the downstream DSLAM assigned data rate change implementation routines 338, 428 in modems 208, 222.

Following completion of modem initialization and selection of a downstream assigned data rate 382, subsection 704 is activated, and the downstream performance monitoring starts in step 708. Operation proceeds to step 710, where MODEM 222 monitors the current downstream signaling, measures a downstream ATN 440 and a downstream SNR 442, an determines a downstream noise margin 444. The process of step 710 is repeated on an ongoing basis, e.g., periodically. The time intervals between new determinations of the downstream noise margin 444, e.g., 1 ms to 1 hr, may be determined by a number of settings in the configuration parameters stored in the DSLAM 208 and/or the MODEM 222. Proceeding to step 712, for each determined downstream noise margin 444, a test is made as to whether the downstream signal data rate, e.g., the assigned downstream data rate 454, should be lowered due to a low noise margin. The test involves comparing the downstream noise margin 444 to the downstream decreasing adjustment threshold 450. The downstream decreasing adjustment threshold 450 has been preselected at a level which will result in a transition to a lower downstream assigned data rate 454, before synchronization is lost, resulting in smooth dynamic transitions to the lower rate. If the downstream noise margin 444 is lower than the downstream decreasing adjustment threshold 450, then flow proceeds to step 714, where a new downstream rate is calculated by decrementing the current assigned downstream rate 454 by one step size. The new downstream data rate will be forwarded to step 738 of the downstream data rate change implementation section 706. However, in step 712, if the downstream noise margin 444, exceeds the downstream decreasing adjustment threshold 450, it has been determined that the downstream noise margin 444 is at least high enough to support the current downstream assigned data rate 454, and so operation proceeds to step 716. In step 716, the downstream noise margin 444 is tested against the downstream increasing adjustment threshold 448 to determine if there is sufficient margin to ratchet up the assigned downstream data rate 454.

If the downstream noise margin 444 exceeds the downstream increasing adjustment threshold 448, the line conditions can support a higher data rate, and therefore flow proceeds to step 718. In step 178, a new downstream data rate is calculated by increasing the current assigned downstream data rate 454 by one step size. Next, in step 720, the new downstream data rate is compared to the downstream subscribed data rate 436. If the new downstream data rate is $\leq$ the downstream subscribed data rate 436, then the new downstream data rate is forwarded to step 738 of the downstream data rate change implementation section 706; otherwise, flow returns to via connection node C 722 to step 710. Returning to step 716, if it was determined that the downstream noise margin 444 die not exceed the downstream increasing adjustment threshold 448, then the DSL is currently operating at the maximum capacity and no action should be taken, so flow proceeds via connection node C 722 back to step 710.

In parallel to the noise monitoring of section 704, the downstream provisioning rate adjustment section 702 may be executed. Operation starts in step 724 where the provisioning system 210, processes a service level request change from a user. The service level request change may be either a provisioning request, e.g., a subscriber profile change, or an application driven temporary service level request for a change in change in bandwidth, e.g., on-demand high bit services. The request may have been routed to the provisioning system 210 via communications through telephone modem 224 or through MODEM 222; however, in either case, services are not interrupted by the request. As a result of step 724, the provisioning system 210 signals the billing system 212 providing notification of the change in user service level in step 726, and the provisioning system 210 also signals the DSLAM 208 by sending the service level request change information 344 and the new downstream subscribed data rate 346 in step 728. Next, in step 730, DSLAM 208 forwards the new downstream subscribed data rate 346 in a write message to MODEM 222. In step 732, MODEM 222 responds and sends an acknowledgement signal to the DSLAM modem 208. In step 734, MODEM 222 determines the maximum possible downstream data rate 452 based on the current line conditions, e.g., downstream ATN 440 and the downstream SNR 442. In step 736, MODEM 222 determines if the downstream assigned data rate 454 should be increased by evaluating if maximum possible downstream data rate 452 exceeds the current assigned downstream data rate 454 and does not exceed the downstream subscribed data rate 436. In step 736, MODEM 222 determines that the assigned downstream data should be decreased if the new downstream subscribed data rate 436 is below the current assigned downstream data rate 454. If dictated, a new downstream data rate is calculated in step 736 and forwarded to step 738 of the downstream data rate change implementation section 706. In some embodiments, where an increase is called for, the data rate is increased in a single step size. If it is determined in step 736, that the assigned downstream data rate 454 cannot be changed at the present time, due to line conditions, no action is taken; however, the new downstream subscribed data rate 436 has been loaded into the MODEM 222, allowing the downstream performance monitoring section 704 to make the adjustment to a new assigned downstream data rate 454, at a later time, whenever line conditions indicate that it is supportable.

The downstream data rate change implementation section 706 of flowchart 700 will now be described. In step 738, the MODEM 222 sends a request new data rate message to the DSLAM 208 with the new downstream data rate value. The new downstream requested data rate value may have been generated as output from the noise monitoring section 704 in steps 714 or 720 or as output from the provisioning section 702 in step 736. Proceeding to step 740, the DSLAM 208 receives the new requested downstream rate value. In step 742, the DSLAM 208 verifies that the new downstream requested rate value does not exceed the downstream subscribed date rate 346. If the verification check passes in step 742, step 744 is performed where DSLAM 208 sets the assigned downstream data rate 382 equal to the new requested downstream data rate. Next, in step 746, the DSLAM 208 sends a write data rate message to MODEM 222, conveying the new assigned downstream data rate 382. In step 748, the MODEM 222 receives the new data rate, updates the assigned downstream data rate 454 in its memory 408, and sends beck an acknowledgement to the DSLAM 208. Next in step 750, the DSLAM 208 changes the downstream data rate to the new assigned downstream data rate 382. The DSLAM changes the rates after the modem sends the acknowledgement of the request. In step 752, MODEM 222 and DSLAM 208 operate at the new data rate, the transition having been without interruption of service, in accordance with the invention. Next flow proceeds via connection node C 722 back to performance monitoring step 710, where new downstream ATN 440 and SNR 442 measurements are made. Referring back to step 722, if it was determined that the new requested downstream data rate exceeded the downstream subscribed data rate 346, the request is denied, a warning message may be sent to the MODEM 222 and/or to the provisioning system 210, and flow is directed via connection node C 722 back to the performance monitoring of step 710.

Figure 8:
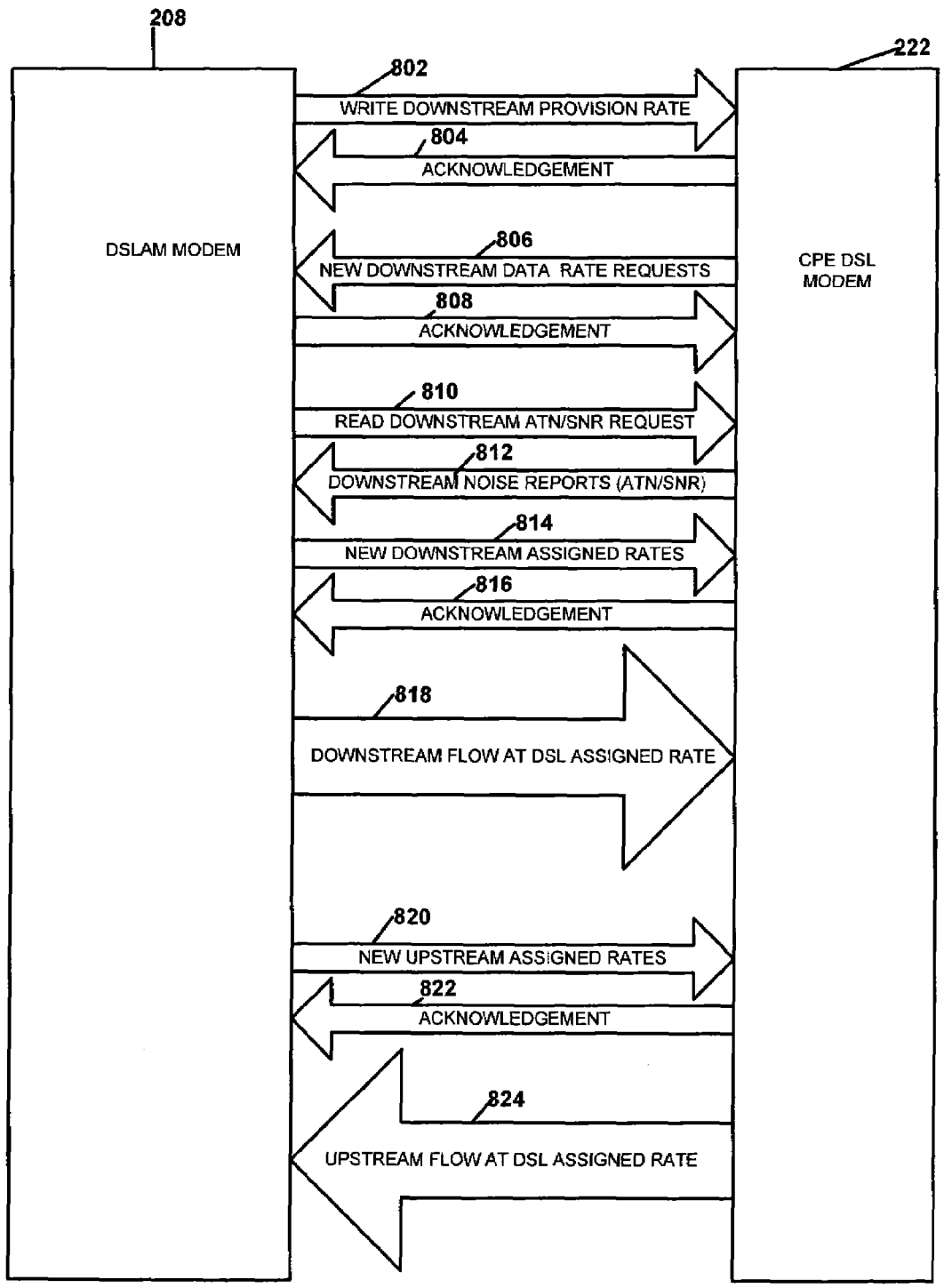
FIG. 8 illustrates exemplary signaling exchanges between an exemplary DSLAM modem and an exemplary CPE DSL modem used to explain the present invention.

FIG. 8 illustrates exemplary signaling that may be used between DSLAM 208 and MODEM 222 during implementation of the methods of the present invention in some embodiments. The DSLAM 208, in some embodiments, is responsible for assigning both the downstream and upstream data rates. The line condition measurements, e.g., SNR and ATN are typically performed at the receiving end.

In some embodiments, the MODEM 222 makes downstream rate adjustments requests to the DSLAM 208. Under such scenarios, a write downstream provisional rate message 802 may be sent to the MODEM 222, and MODEM 222 will respond by sending an acknowledgement message 804 to the DSLAM 208. If MODEM 222 has knowledge of the downstream provisioned rate, MODEM 222 should not generate and transmit extraneous requests for higher than allowable data rates which would be rejected by DSLAM 208.

For downstream flow 818 (from DSLAM 208 to MODEM 22), the line condition measurements are typically made at MODEM 222. In some embodiments, the DSLAM 208 may formulate the new downstream rate values. In such embodiments, the DSLAM 208 may send read downstream ATN/SNR request messages 810, and the MODEM 222 should respond with downstream noise report (ATN/SNR) messages 812. In such embodiment, the DSLAM 208 will use the information in messages 812 to calculate a new downstream data rate.

The DSLAM 208 assigns a new downstream data rate and conveys the information to MODEM 222 via message 814. MODEM 222 responds with an acknowledgement 816, and then downstream flow at the new assigned DSL data rate 818 may be performed.

For upstream flow 824 (from MODEM 222 to DSLAM 208), the line condition measurements, and rate adjustments checks and decisions are typically performed at DSLAM 208. When DSLAM 208 decides that a new upstream rate should be assigned, it conveys the information to MODEM 222 via message 820, and MODEM 222 responds with an acknowledgement 822. Then upstream signal flow 824 at the new assigned DSL upstream data rate may be performed.

FIG. 9 shows a table 900 describing some exemplary embedded operations channel (EOC) messages which may be used to convey information utilized in some implementation of the present invention. First column 914 lists the HEX EOC Opcodes, while second column 916 describes the Opcode function. Third column 918 lists the direction of message flow (downstream and/or upstream). Fourth column 920 lists abbreviations used for each Opcode function described. First row 902 lists titles for each column of the table. The second row 904 lists the Request Test parameter Update (REQTPU) Opcode 13(H); the DSLAM 208 sends the REQTPU message to the MODEM 222 in the downstream direction, e.g., during initialization, and the MODEM 222 acknowledges by sending a test parameter update in a message to the DSLAM 208 in the upstream direction. The third row 906 lists the Write data register numbers 0-F (Write) commands and the sixteen corresponding Opcodes, each Opcode corresponding to one of sixteen registers in MODEM 222. A Write Data command may be used, e.g., to transfer downstream provisioned rate information from the DSLAM 208 into a configuration register of MODEM 222, and MODEM 222 may respond with an acknowledgement message. The fourth row 908 lists the Read data register numbers 0-F (Read) commands and the sixteen corresponding Opcodes, each Opcode corresponding to one of sixteen registers in MODEM 222. Read data command messages may be used, e.g., to request downstream ATN and SNR information from MODEM 222 by the DSLAM 208; MODEM 222 will respond and return the contents of its line attenuation and SNR margin registers. Fifth row 910, list the Write new Data Rate command (New Write) usiing Opcode 19, which may be used to convey new assigned data rates from DSLAM 208 to MODEM 222. Sixth row 912, lists an uplink Request new Data Rate (REQNDR) Opcode 1A, which may be used by MODEM 222 to request new assigned data rates, either higher or lower, from DSLAM 208. Other EOC messages are possible to accomplish the signaling in accordance with the invention. Within the EOC message structure, there are a number of undefined Opcodes which have been reserved for future expansion, and there are a number of Opcodes reserved for vendor proprietary protocols, as well as reserved and vendor discretionary modem registers. Any of these reserved and/or vendor discretionary Opcodes and/or registers may be utilized for the purposes of implementing the present invention.

While increasing a DSL line rate in response to detecting SNR conditions above a pre-selected increasing threshold has been described, in some embodiments before the line rate is increased, a test is made on the additional frequencies which will be used to support the higher data rate. In such a case, since the frequencies being tested using a test signal are different from those which are used to support an ongoing communications session at the lower rate, the test of the additional frequencies need not interfere with ongoing communications. In such a case, the test signal is used to determine if the additional frequencies will support the higher data rate to which the line rate is going to be switched. Assuming satisfactory test results at the additional frequencies, the transition to the higher data rate proceeds as described above. However, if the testing of the previously unused frequencies indicates a problem, e.g., a higher than expected SNR for the additional, previously unused frequencies which will be used to support the higher data rate, the transition to the higher data rate is not made and the line rate is not altered until such time as both a SNR exceeding the increasing threshold is detected and a test of the additional frequencies provides satisfactory test results.

What is claimed is:

1. A method implemented at a digital subscriber line (DSL) central office modem comprising:
    assigning a first upstream DSL data rate for a DSL connection;
    determining an upstream noise margin for the DSL connection;
    receiving a request for a higher upstream DSL data rate;
    determining a maximum upstream DSL data rate based on the upstream noise margin; and
    assigning, based on the determined upstream noise margin and the maximum upstream DSL data rate, a second upstream DSL data rate for the DSL connection without re-synchronizing the DSL connection.

2. The method of claim 1, further comprising:
    signaling a billing system in response to receiving the request.

3. The method of claim 1, wherein assigning the second upstream DSL data rate further comprises:
    increasing the first upstream DSL data rate responsive to the maximum upstream DSL data rate exceeding the first upstream DSL data rate.

4. The method of claim 1, wherein the determining an upstream noise margin is performed at a predetermined time interval.

5. The method of claim 4, wherein the predetermined time interval is within a range from at least once per about 1 millisecond to at least once per about 1 hour.

6. The method of claim 1, wherein the upstream noise margin is based on at least one of a signal-to-noise ratio value or an attenuation value.

7. The method as recited in claim 1 further comprising:
    loading the request for the higher upstream DSL data rate into the DSL central office modem to increase the upstream DSL data rate at a later time responsive to the maximum upstream DSL data rate not exceeding the first upstream DSL data rate.

8. A method implemented at a digital subscriber line (DSL) central office modem comprising:
    assigning a first upstream DSL data rate for a DSL connection;
    determining an upstream noise margin for the DSL connection; and
    assigning, based on the determined upstream noise margin, a second upstream DSL data rate for the DSL connection without re-synchronizing the DSL connection, wherein the assigning the second upstream DSL data rate further comprises:
        comparing the upstream noise margin to a predetermined threshold;
        calculating the second upstream DSL data rate for the DSL connection based on the comparing, wherein the predetermined threshold comprises an upstream increasing adjustment threshold and the calculating comprises incrementing the first upstream DSL data rate by a predetermined step to generate an incremented upstream DSL data rate responsive to the upstream noise margin being higher than the upstream increasing adjustment threshold;
        comparing the incremented upstream DSL data rate to an upstream subscriber rate; and
        assigning the second upstream DSL data rate as the incremented upstream DSL data rate responsive to the incremented upstream DSL data rate not exceeding the upstream subscriber rate.

9. A method implemented at a digital subscriber line (DSL) modem comprising:
    assigning a first downstream DSL data rate for a DSL connection;
    determining a downstream noise margin for the DSL connection;
    based on the determined downstream noise margin, sending a request for a second downstream DSL data rate for the DSL connection without re-synchronizing the DSL connection;
    receiving a request for a higher downstream DSL data rate;
    determining a maximum downstream DSL data rate based on the downstream noise margin; and
    wherein the second downstream DSL data rate is based on the maximum downstream DSL data rate.

10. The method of claim 9, further comprising:
    comparing the downstream noise margin to a predetermined threshold; and
    calculating the second downstream DSL data rate for the DSL connection based on the comparing.

11. The method of claim 10, wherein the predetermined threshold comprises a downstream decreasing adjustment threshold and the calculating comprises decrementing the first downstream DSL data rate by a predetermined step responsive to the downstream noise margin being lower than the downstream decreasing adjustment threshold.

12. The method of claim 10, wherein the predetermined threshold comprises a downstream increasing adjustment threshold and the calculating comprises incrementing the first downstream DSL data rate by a predetermined step to generate an incremented downstream DSL data rate responsive to the upstream noise margin being higher than the downstream increasing adjustment threshold.

13. The method of claim 9, wherein the determining a downstream noise margin is performed at a predetermined time interval.

14. The method of claim 13, wherein the predetermined time interval is at least twice a predetermined time interval for determining an upstream noise margin.

15. The method of claim 13, wherein the predetermined time interval is within a range from at least once per about 1 millisecond to at least once per about 1 hour.

16. The method of claim 9, wherein the downstream noise margin is based on at least one of a signal-to-noise ratio value or an attenuation value.

17. A method implemented at a digital subscriber line (DSL) modem comprising:
    assigning a first downstream DSL data rate for a DSL connection;
    determining a downstream noise margin for the DSL connection;
    comparing the downstream noise margin to a predetermined threshold;
    calculating a second downstream DSL data rate for the DSL connection based on the comparing;
    sending a request for the second downstream DSL data rate for the DSL connection without re-synchronizing the DSL connection;
    wherein the predetermined threshold comprises a downstream increasing adjustment threshold and the calculating comprises incrementing the first downstream DSL data rate by a predetermined step to generate an incremented downstream DSL data rate responsive to the upstream noise margin being higher than the downstream increasing adjustment threshold; and wherein the calculating further comprises:
  comparing the incremented upstream DSL data rate to a downstream subscriber rate; and
  assigning the second upstream DSL data rate as the incremented downstream DSL data rate responsive to the incremented downstream DSL data rate not exceeding the downstream subscriber rate.

18. A digital subscriber line (DSL) modem comprising:
  a DSL interface circuit configured to communicate on a DSL connection; and
  a controller coupled to the DSL interface circuit, wherein the controller is configured to operate the DSL connection through the DSL interface circuit at a first upstream DSL data rate, and wherein the controller is configured to assign a second upstream DSL data rate responsive to an upstream noise margin for the DSL connection, wherein the second upstream DSL data rate is assigned without re-synchronizing the DSL connection, wherein the controller is configured to determine a maximum upstream DSL data rate based on the upstream noise margin and, in response to receiving a request for an increased upstream DSL data rate, the controller is configured to assign the second upstream DSL data rate based on the maximum upstream DSL data rate.

19. The DSL modem as recited in claim 18, wherein the controller is configured to compare the upstream noise margin to a predetermined threshold, and wherein the controller is configured to determine the second upstream DSL data rate based on a result of the comparison.

20. The DSL modem as recited in claim 19, wherein the predetermined threshold comprises an upstream decreasing adjustment threshold and the second upstream DSL data rate is less than the first upstream DSL data rate responsive to the upstream noise margin being lower than the upstream decreasing adjustment threshold.

21. The DSL modem as recited in claim 19, wherein the predetermined threshold comprises an upstream increasing adjustment threshold and the controller is configured to generate an incremented upstream DSL data rate from the first upstream DSL data rate, wherein the controller is configured to generate the incremented upstream DSL data rate responsive to the upstream noise margin being higher than the upstream increasing adjustment threshold.

22. The DSL modem as recited in claim 21, wherein the controller is configured to assign the second upstream DSL data rate as the incremented upstream DSL data rate responsive to the incremented upstream DSL data rate not exceeding an upstream subscriber rate.

23. The DSL modem as recited in claim 18, wherein the upstream noise margin is based on at least one of a signal-to-noise ratio value or an attenuation value.

24. A digital subscriber line (DSL) modem comprising:
  a DSL interface circuit configured to communicate on a DSL connection; and
  a controller coupled to the DSL interface circuit, wherein the controller is configured to operate the DSL connection through the DSL interface circuit at a first upstream DSL data rate, and wherein the controller is configured to assign a second upstream DSL data rate responsive to an upstream noise margin for the DSL connection, wherein the second upstream DSL data rate is assigned without re-synchronizing the DSL connection, wherein the controller is further configured to transmit a read downstream noise margin request on the DSL connection, and based on a received downstream noise margin provided in response to the read downstream noise margin request, the controller is configured to assign a first downstream DSL data rate without re-synchronizing the DSL connection, wherein the first downstream DSL data rate differs from a current downstream DSL data rate.

25. A digital subscriber line access multiplexor (DSLAM) comprising a plurality of digital subscriber line (DSL) modems configured to communicate on DSL connections, wherein each DSL modem is configured to operate on a respective DSL connection at a first upstream DSL data rate, and wherein each DSL modem is configured to assign a second upstream DSL data rate responsive to an upstream noise margin for the respective DSL connection, wherein the second upstream DSL data rate is assigned without re-synchronizing the respective DSL connection, and wherein each DSL modem is configured to determine a maximum upstream DSL data rate based on the upstream noise margin and, in response to receiving a request for an increased upstream DSL data rate from the respective DSL connection, is configured to assign the second upstream DSL data rate based on the maximum upstream DSL data rate.

26. The DSLAM as recited in claim 25 further configured to couple to a billing system in a central office, wherein the DSLAM is configured to signal the billing system responsive to receiving the request for an increased upstream DSL data rate.

* * * * *

UNITED STATES PATENT AND TRADEMARK OFFICE
CERTIFICATE OF CORRECTION

PATENT NO. : 8,457,181 B2  
APPLICATION NO. : 11/961018  
DATED : June 4, 2013  
INVENTOR(S) : Remy et al.

Page 1 of 4

It is certified that error appears in the above-identified patent and that said Letters Patent is hereby corrected as shown below:

On the Title Page, in item (75), under "Inventors", in Column 1, Line 1, delete "E" and insert -- E. --, therefor.

In the Drawings

Figure 1:
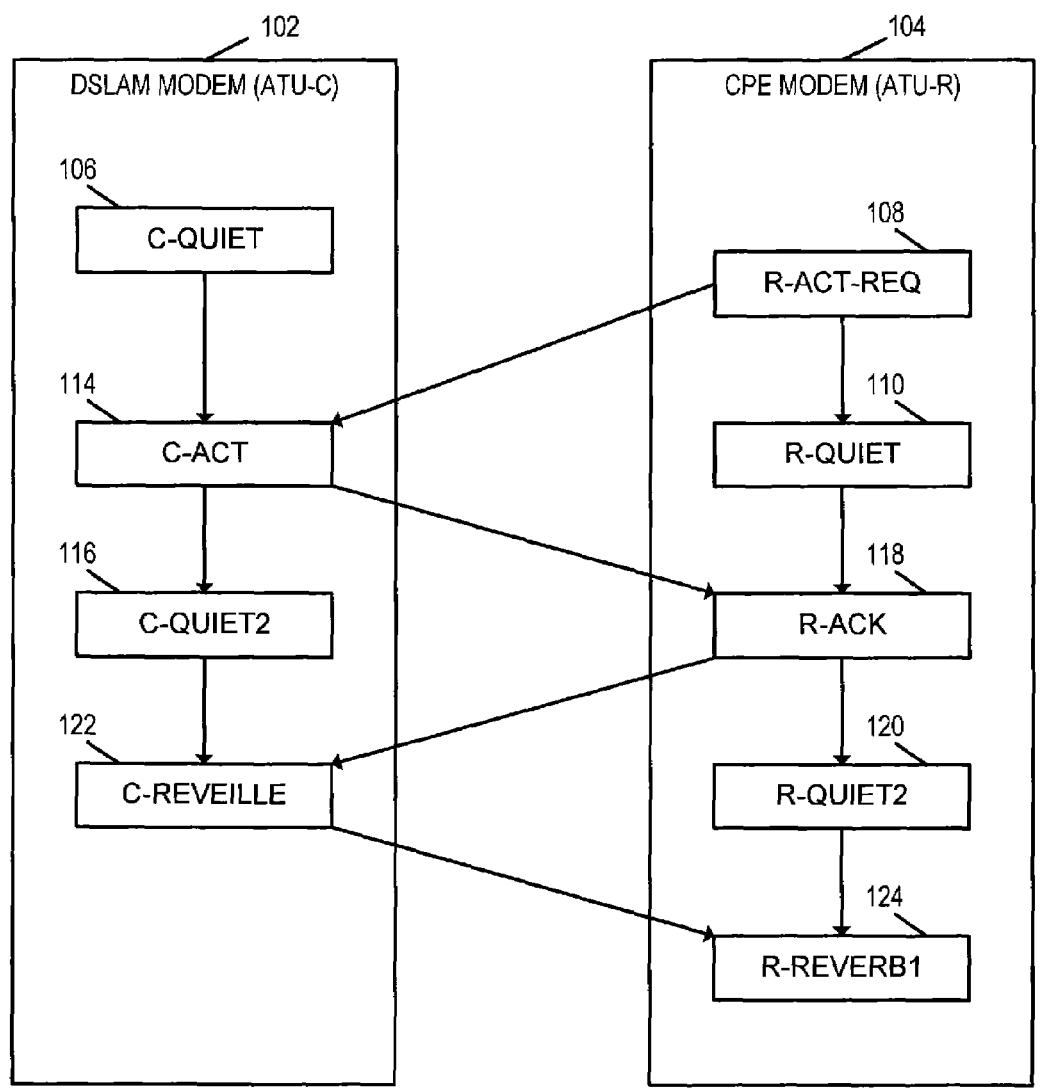
FIG. 1 illustrates a known initialization sequence used for the ANSIT1.413 standard that takes place between an ATU-C and an ATU-R.

In Fig. 1, Sheet 1 of 9, insert main designator --  --.

In Fig. 3, Sheet 3 of 9, for Tag "374", Line 2, delete "INCREADING" and insert -- INCREASING --, therefor.

In Fig. 4, Sheet 4 of 9, delete " ———— " and insert -- -- , therefor.

In Fig. 7, Sheet 7 of 9, for Tag "738", Lines 1-2, delete "MESSAGE TO TO DSLAM" and insert -- MESSAGE TO THE DSLAM --, therefor.

In Fig. 9, Sheet 9 of 9, insert main designator -- 900 --.

In the Specification

In Column 1, Line 38, delete "asymmetric Digital Subscriber Line (ADSL)" and insert -- Asymmetric Digital Subscriber Line (ADSL) --, therefor.

Signed and Sealed this  
First Day of July, 2014

Michelle K. Lee  
*Deputy Director of the United States Patent and Trademark Office*

CERTIFICATE OF CORRECTION (continued)
U.S. Pat. No. 8,457,181 B2

In Column 2, Line 6, delete "R-RACT-REQ 108" and insert -- R-ACT-REQ 108 --, therefor.

In Column 2, Lines 11-13,
delete "C-ACT1k=48 tone(207 kHz), C-ACT2k=44 tone (189.75 kHz), C-ACT3k=52 tone (224.25 kHz), or C-ACT4k=60 tone" and
insert -- C-ACT1 k=48 tone (207 kHz), C-ACT2 k=44 tone (189.75 kHz), C-ACT3 k=52 tone (224.25 kHz), or C-ACT4 k=60 tone --, therefor.

In Column 2, Line 15, delete "C-QUIET2116." and insert -- C-QUIET2 116. --, therefor.

In Column 2, Line 20, delete "R-ACT1: k=10" and insert -- R-ACT1 k=10 --, therefor.

In Column 2, Line 21, delete "R-ACT2k=12" and insert -- R-ACT2 k=12 --, therefor.

In Column 2, Line 24, delete "R-ACT signal 118," and insert -- R-ACK signal 118, --, therefor.

In Column 2, Line 25, delete "C-REVEILLE 112," and insert -- C-REVEILLE 122, --, therefor.

In Column 2, Line 30, delete "extract" and insert -- exact --, therefor.

In Column 2, Line 35, delete "tone or 7" and insert -- tone 6 or 7 --, therefor.

In Column 2, Lines 56-57, delete "capabilities" and insert -- capabilities, --, therefor.

In Column 3, Line 1, delete "ITU G.002.1" and insert -- ITU G.992.1 --, therefor.

In Column 3, Line 21, delete "in at attempt" and insert -- in an attempt --, therefor.

In Column 3, Line 38, delete "date rate." and insert -- data rate. --, therefor.

In Column 3, Line 46, delete "in know" and insert -- in known --, therefor.

In Column 3, Line 55, delete "date rate" and insert -- data rate --, therefor.

In Column 4, Line 8, delete "application then" and insert -- application and then --, therefor.

In Column 5, Line 5, delete "the determine" and insert -- to determine --, therefor.

In Column 5, Lines 13-14, delete "32 Kbs" and insert -- 32 Kbps --, therefor.

In Column 6, Line 16, delete "changer" and insert -- changed --, therefor.

In Column 6, Line 61, delete "ANSIT1.413 standared" and insert -- ANSI T1.413 standard --, therefor.

In Column 7, Line 13, delete "illustrates exemplary" and insert -- illustrates an exemplary --, therefor.

CERTIFICATE OF CORRECTION (continued)

In Column 7, Line 53, delete "computer site 204." and insert -- customer site computer 204. --, therefor.

In Column 8, Line 2, delete "routine 236," and insert -- routines 236, --, therefor.

In Column 8, Line 49, delete "video conference software 238," and insert -- video conference software 236, --, therefor.

In Column 8, Line 63, delete "but 218" and insert -- bus 218 --, therefor.

In Column 9, Line 48, delete "308, 310" and insert -- 308, and 310 --, therefor.

In Column 10, Line 11, delete "but 218," and insert -- bus 218, --, therefor.

In Column 10, Line 12, delete "DLAM" and insert -- DSLAM --, therefor.

In Column 10, Lines 35-36, delete "DSLAM modem 308" and insert -- DSLAM modem 208 --, therefor.

In Column 11, Lines 23-24, delete "downstream increasing adjustment threshold 370" and insert -- downstream increasing adjustment threshold 368 --, therefor.

In Column 12, Line 6, delete "date rate" and insert -- data rate --, therefor.

In Column 12, Line 9, delete "date rate 348" and insert -- data rate 348 --, therefor.

In Column 12, Line 10, delete "max possible upstream date rate 380." and insert -- max possible upstream data rate 380. --, therefor.

In Column 12, Line 38, delete "downstream noise margin info 360" and insert -- downstream noise margin info 350 --, therefor.

In Column 12, Line 55, delete "DSLAM modem 308" and insert -- DSLAM modem 208 --, therefor.

In Column 13, Line 10, delete "rate adjustment routine 322" and insert -- rate adjustment routine 332 --, therefor.

In Column 13, Line 35, delete "ad line" and insert -- as line --, therefor.

In Column 13, Line 54, delete "DSLM" and insert -- DSLAM --, therefor.

In Column 14, Lines 6-7, delete "downstream data rate 384" and insert -- downstream data rate 382 --, therefor.

In Column 14, Line 16, delete "Memory 410" and insert -- Memory 408 --, therefor.

CERTIFICATE OF CORRECTION (continued)

U.S. Pat. No. 8,457,181 B2

In Column 15, Line 7, delete "Dowstream" and insert -- Downstream --, therefor.

In Column 15, Line 42, delete "downstream-upstream" and insert -- downstream/upstream --, therefor.

In Column 16, Line 14, delete "form the" and insert -- for the --, therefor.

In Column 17, Line 4, delete "implantation" and insert -- implementation --, therefor.

In Column 17, Line 18, delete "CPE DSL modem 202." and insert -- CPE DSL modem 222. --, therefor.

In Column 17, Line 52, delete "implantation" and insert -- implementation --, therefor.

In Column 19, Line 20, delete "MODEM 202." and insert -- MODEM 222. --, therefor.

In Column 19, Line 42, delete "G.922.1" and insert -- G.992.1 --, therefor.

In Column 20, Line 45, delete "into DSLAM" and insert -- into the DSLAM --, therefor.

In Column 21, Line 3, delete "illustration" and insert -- illustrating --, therefor.

In Column 21, Line 8, delete "the DSLAM" and insert -- to the DSLAM --, therefor.

In Column 21, Line 19, delete "740," and insert -- 704, --, therefor.

In Column 22, Line 4, delete "step 178," and insert -- step 718, --, therefor.

In Column 22, Line 13, delete "444 die" and insert -- 444 did --, therefor.

In Column 23, Line 6, delete "date rate" and insert -- data rate --, therefor.

In Column 23, Line 13, delete "beck" and insert -- back --, therefor.

In Column 23, Line 31, delete "illustrates exemplary" and insert -- illustrates an exemplary --, therefor.

In Column 23, Lines 47-48, delete "MODEM 22)," and insert -- MODEM 222), --, therefor.

In Column 24, Line 35, delete "usiing Opcode 19," and insert -- using Opcode 19, --, therefor.

In Column 24, Line 37, delete "Request new Data Rate (REQNDR)" and insert -- Request New Data Rate (REQNDR) --, therefor.